United States Patent
Moore et al.

(10) Patent No.: US 6,244,623 B1
(45) Date of Patent: Jun. 12, 2001

(54) FLOW-OPEN INFLATOR

(75) Inventors: Walter A. Moore, Parker, CO (US); Karl K. Rink, Liberty, UT (US); David J. Green, Brigham City, UT (US); Robert E. Lewis, Roy, UT (US); Gregory J. Lang, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/497,049

(22) Filed: Feb. 2, 2000

(51) Int. Cl.[7] .................................................. B60R 21/26
(52) U.S. Cl. ............................................ 280/737; 280/741
(58) Field of Search ...................... 280/736, 737, 280/741

(56) References Cited

U.S. PATENT DOCUMENTS

| | | | |
|---|---|---|---|
| 5,060,973 | 10/1991 | Giovanetti | 280/736 |
| 5,076,607 | 12/1991 | Woods et al. | 280/737 |
| 5,330,730 | 7/1994 | Brede et al. | 422/305 |
| 5,470,104 | 11/1995 | Smith et al. | 280/737 |
| 5,494,312 | 2/1996 | Rink | 280/737 |
| 5,504,288 | 4/1996 | Morin | 200/83 P |
| 5,531,473 | 7/1996 | Rink et al. | 280/737 |
| 5,536,339 | 7/1996 | Verneker | 149/19.5 |
| 5,571,988 | 11/1996 | Hagel et al. | 149/1 |
| 5,586,386 | 12/1996 | Morin | 29/622 |
| 5,607,181 | 3/1997 | Richardson et al. | 280/737 |
| 5,613,703 | * 3/1997 | Fischer | 280/737 |
| 5,649,720 | 7/1997 | Rink et al. | 280/737 |
| 5,669,629 | 9/1997 | Rink | 280/741 |
| 5,673,933 | 10/1997 | Miller et al. | 280/736 |
| 5,683,104 | 11/1997 | Smith | 280/736 |
| 5,762,369 | 6/1998 | Mooney et al. | 280/741 |
| 5,803,493 | 9/1998 | Paxton et al. | 280/737 |
| 5,806,885 | 9/1998 | Hock | 280/737 |
| 5,884,938 | 3/1999 | Rink et al. | 280/741 |
| 5,890,735 | * 4/1999 | Smith | 280/737 |
| 5,893,583 | * 4/1999 | Blumenthal et al. | 280/737 |
| 5,941,562 | 8/1999 | Rink et al. | 280/737 |
| 6,062,599 | * 5/2000 | Forbes et al. | 280/737 |

* cited by examiner

*Primary Examiner*—Kenneth R. Rice
(74) *Attorney, Agent, or Firm*—Sally J. Brown

(57) ABSTRACT

An inflator apparatus for inflating an inflatable device and a method are provided which utilize a burst disk arrangement which results in a sequential opening regime such as may desirably provide a form of the above-described S curve inflation performance behavior without necessitating the use of or reliance on mechanical opening devices such as projectiles or piston members.

29 Claims, 10 Drawing Sheets

FLOW-OPEN INFLATOR

BACKGROUND OF THE INVENTION

This invention relates generally to pressurized fluid-containing devices and, more particularly, to an apparatus and associated methods of operation such as for use in the inflation of an inflatable device. More specifically, the invention relates to an apparatus and associated methods of operation such as for use in the inflation of inflatable devices such as inflatable vehicle occupant restraint airbag cushions used in inflatable restraint systems.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

"Rise rate", i.e., the rate at which the gas output from an inflator increases pressure, as measured when such gas output is directed into a closed volume, is a common performance parameter used in the design, selection and evaluation of inflator devices for particular vehicular airbag restraint system installations. It is commonly desired that an inflatable restraint airbag cushion initially inflate in a relatively gradual manner, soon followed by the passage of inflation gas into the airbag cushion at a relatively greater or increased pressure rate. An inflator resulting in such inflation characteristics is commonly referred to in the field as producing inflation gas in accordance with an "S" curve.

Many types of inflator devices have been disclosed in the art for the inflating of one or more inflatable restraint system airbag cushions. One category of such inflator devices is often referred to as "compressed gas inflators" and refers to various inflators which contain a selected quantity of compressed gas. For example, one particular type of compressed gas inflator, commonly referred to as a "stored gas inflator," simply contains a quantity of a stored compressed gas which is selectively released to inflate an associated airbag cushion.

A second type of compressed gas inflator, commonly referred to as a "hybrid inflator," typically supplies or provides inflation gas as a result of a combination of stored compressed gas with the combustion products resulting from the combustion of a gas generating material, e.g., a pyrotechnic.

Commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996 disclose and relate to a new type of inflator device, sometimes called a "fluid fueled inflator." Such inflator devices typically utilize a fuel material in the form of a fluid, e.g., in the form of a gas, liquid, finely divided solid, or one or more combinations thereof, in the formation of an inflation gas for an airbag cushion. In one form of fluid fueled inflator, such a fluid fuel material is burned to produce gas which contacts a quantity of stored pressurized gas to produce inflation gas for use in inflating a respective inflatable device.

A more recently developed inflator device is at least in part the subject of commonly assigned Rink, U.S. Pat. No. 5,669,629, issued Sep. 23, 1997; Rink et al., U.S. Pat. No. 5,884,938, issued Mar. 23, 1999; and Rink et al., U.S. Pat. No. 5,941,562, issued Aug. 24, 1999, the disclosures of which patents are hereby and expressly incorporated herein in their entirety. In one form of such newly developed inflator device, inflation gas is produced or formed, at least in part, via the decomposition or dissociation of a selected gas source material, such as in the form of a compressed gas and such as via the input of heat from an associated heat source supply or device.

Specific categories or types of compressed gas inflator devices include those commonly referred to as "blow down" and those referred to as "direct opening" inflation systems. In a blow down inflation system, a pyrotechnic or other selected material is commonly burned to create a build-up of pressure within a compressed gas storage chamber such as to result in the rupture or release of inflation gas therefrom when the internal pressure reaches a predetermined level or range. In contrast, in a direct opening type inflation system, compressed gas is commonly released as a result of the movement of a mechanical opening device such as an associated projectile or piston member.

While blow down inflation systems can desirably be of relatively lower cost and complexity, such systems can result in the delivery of inflation gas to an associated airbag cushion at a higher temperature, pressure and/or mass flow rate than may otherwise be desired. In contrast, direct opening inflation systems typically permit a portion of the associated stored compressed gas to be released prior to any substantial heating thereof such as typically results upon the thermal contact thereof with the combustion products resulting from combustion of the associated gas generating material. With such initial release of unheated gas, the inflation gas initially delivered during the first few moments upon actuation is typically at a relatively low pressure, thus desirably providing a form of the above-described S curve inflation performance behavior. In particular, such operation can advantageously provide what is commonly termed as a "soft deployment" of the associated airbag cushion. As known in the art, such soft deployments can be desired in various circumstances such as in the event the corresponding vehicle occupant is out-of-position for what is normally considered optimal protection via the restraint system.

Unfortunately, the use of or reliance on mechanical opening devices such as projectiles or piston members in such direct opening inflation systems may result in inflation systems which may be either or both more costly or complicated than desired.

Thus, there is a need and a demand for an inflation system and particularly an inflator apparatus and method of operation which can desirably provide for a soft deployment of an associated airbag cushion without necessitating the use of or reliance on mechanical opening devices such as projectiles or piston members, the use or operation of which may be either or both more costly or complicated than desired.

Further, in view of possibly varying operating conditions and, in turn, possibly varying desired performance characteristics, there is a need and a desire to provide what has been termed an "adaptive" inflatable restraint system. With an adaptive inflatable restraint system, one or more parameters such as the quantity, supply, and rate of supply of inflation gas, for example, can be selectively and appropriately varied dependent on one or more selected operating conditions such as ambient temperature, occupant presence, seat belt usage, seat position of occupant and rate of deceleration of the motor vehicle, for example.

While such adaptive systems are desirable, they typically require the inclusion of additional components either in the system or as a part of the associated inflator device itself. Such inclusion of one or more additional components may undesirably increase the size, cost and/or weight of the inflator device or associated system. For example, various proposed or currently available dual stage inflator devices, particularly pyrotechnic-based forms thereof, appear based on the principal of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design.

Stored or compressed gas-based adaptive inflation systems may overcome or at least minimize certain of such disadvantages. For example, such corresponding inflator devices may contain or utilize a single or "common" gas storage chamber for the provision of two or, possibly, more levels of performance or inflation pressures such as by selectively heating the stored gas to selected higher levels of pressure. Nevertheless, there is a need and demand for even more flexible inflation systems such as may capably provide an even wider array of selectable performance options.

For example, a common problem with typical or conventional stored gas adaptive output inflator designs is a lack of a desired range of outputs between the standard output and adaptive output of such inflator devices (such as measured in terms of pressure in a closed tank). Typically, the second or "adaptive" level pressure is only 10% to 30% (perhaps) of the total output of the inflator. In practice, those skilled in the art commonly refer to the performance "split" of an adaptive inflator. For example, if an inflator produces an output of 25 psi in the single stage "standard" mode, and 50 psi with the firing of both standard and adaptive stages, such an inflator is said to display a 50—50 "split". In other words, the performance split is the fraction that each stage "standard" and "adaptive" contributes to the maximum performance. Thus, typical stored gas adaptive output inflators typically produce a performance split of up to about 70–30.

In addition, stored gas hybrid inflators most commonly store or contain inert gas. Thus, the adaptive output or additional performance obtainable therefrom largely results from volume expansion of the stored gas such as due to heat provided or supplied from an additional pyrotechnic charge. In particular, if the pyrotechnic charge simply produces heat (no gas) there is no increase in molar (volumetric) output of the inflator under such adaptive output conditions. If the pyrotechnic charge does produce some gas as well as heat, the additional gas molar output is usually quite small. Thus, the performance splits readily obtainable with such hybrid inflators are typically directly a function of the amount of pyrotechnic which can be packed into the adaptive stage before the internal pressures generated become too severe for practical construction. Further, as pyrotechnic materials can be relatively expensive and difficult to manufacture, the use and reliance of increased pyrotechnic loads may render such approaches economically unattractive.

Thus, there is a need and a demand for an adaptive inflation system which more readily permits or otherwise allows a desirably greater range in performance capabilities, such as may more readily provide desired or required design and application flexibility.

SUMMARY OF THE INVENTION

A general object of the invention is to provide an improved apparatus and method for inflating an inflatable device.

A more specific objective of the invention is to overcome one or more of the problems described above.

The general object of the invention can be attained, at least in part, through a specified apparatus for inflating an inflatable device. In accordance with one preferred embodiment, such an apparatus includes a first chamber, a chamber opener, a flow control element, a burst disk and a diffuser assembly. More specifically, the first chamber contains an expandable fluid effective to provide a gaseous inflation medium to inflate the inflatable device. The chamber opener is actuatable to produce a discharge effective to open the first chamber by non-mechanical means. The flow control element includes at least one fluid flow conduit wherethrough at least a portion of the discharge from the chamber opener can be transmitted into chamber-opening communication with the first chamber. The apparatus also includes at least one first chamber entrance opening wherethrough the at least a portion of the discharge from the chamber opener can be directed by the at least one fluid flow conduit into the first chamber. The apparatus further includes at least one first chamber exit opening wherethrough at least a portion of the gaseous inflation medium can be discharged from the first chamber. The burst disk includes a first sealing portion normally preventing flow into the first chamber through the at least one entrance opening and a second sealing portion normally preventing flow out of the first chamber through the at least one exit opening. The diffuser assembly includes at least one exit port for directing gaseous inflation medium discharged from the first chamber to the inflatable device.

The prior art generally fails to provide an inflation apparatus and method of operation effective to provide the soft deployment of an associated inflatable device without necessitating the use of or reliance on mechanical opening or moving devices such as projectiles or piston members, or movable burst disc supports. Thus, the prior art generally fails to provide an inflation apparatus and a method of operation which are as simple and as effective as desired.

The invention, in accordance with another preferred embodiment of the invention, further comprehends an apparatus for inflating an inflatable device, which apparatus includes a first chamber, a heat source, a nozzle, a burst disk and a diffuser assembly. In such an embodiment, the first chamber contains an expandable fluid under an elevated pressure and adapted to provide a gaseous inflation medium to inflate the inflatable device. The heat source includes a second chamber and an initiator. The second chamber contains a charge of a pyrotechnic material effective, upon ignition, to produce a quantity of hot product gas. The initiator, upon actuation, is effective to ignite the pyrotechnic material. The nozzle serves to direct the hot product gas from the heat source to the first chamber. The nozzle has a discharge end wherethrough at least a portion of the quantity of hot product gas from the heat source can be discharged in heat transmitting communication with the contents of the first chamber to heat the expandable fluid to form the gaseous inflation medium. The apparatus also includes at least one entrance opening wherethrough hot product gas can be directed by the nozzle into the first chamber and at least one exit opening wherethrough gaseous inflation medium can be discharged from the first chamber. The burst disk includes a first sealing portion normally preventing flow into the first chamber through the at least one entrance opening and a second sealing portion, including a sealed periphery portion of the burst disk, normally preventing flow out of the first chamber through the at least one exit opening. The first and second sealing portions of the burst disk are concentrically positioned with the second sealing portion radially disposed relative to the first sealing portion. The nozzle normally at least in part supports the first sealing portion against the pressure of the contents of the first chamber. The diffuser assembly includes at least one exit port for directing gaseous inflation medium discharged from the first chamber to the inflatable device, wherein the diffuser assembly normally at least in part supports the second sealing portion against the pressure of the contents of the first chamber.

The invention still further comprehends a method of operation for an airbag inflator, which inflator includes:

a first chamber containing a pressurized expandable fluid effective to provide a gaseous inflation medium;

a chamber opener actuatable to produce a discharge effective to open the first chamber by non-mechanical means;

a flow control element including at least one fluid flow conduit having a discharge end wherethrough at least a portion of the discharge from the chamber opener can be transmitted into chamber-opening communication with the first chamber;

at least one first chamber entrance opening wherethrough the at least a portion of the discharge from the chamber opener can be directed by the at least one fluid flow conduit into the first chamber;

at least one first chamber exit opening wherethrough at least a portion of the gaseous inflation medium can be discharged from the first chamber;

a burst disk including a first sealing portion normally preventing flow into the first chamber through the at least one entrance opening and a second sealing portion normally preventing flow out of the first chamber through the at least one exit opening; and a diffuser assembly including at least one exit port for directing gaseous inflation medium discharged from the first chamber.

In accordance with one preferred embodiment, such a method includes actuating the chamber opener to produce a chamber-opening discharge. Then, directing at least a portion of the chamber-opening discharge through the flow control element and against the first sealing portion of the burst disk to effect the opening thereof, resulting in expansion of the expandable fluid and formation of the gaseous inflation medium. Subsequently, opening the second sealing portion of the burst disk to permit flow of at least a portion of the gaseous inflation medium out of the first chamber through the at least one exit opening and then directing at least a portion of the gaseous inflation medium flowing through the at least one exit opening out of the inflator through the at least one exit port.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A/(F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

References herein to a "pyrotechnic" material, refer to a material which in its simplest form, consists of an oxidizing agent and a fuel that produce an exothermic, self-sustaining reaction when heated to the ignition temperature thereof.

References to the detection or sensing of "occupant presence" are to be understood to refer to and include detection and sensing of one or more of the size, weight, and/or positions of a particular occupant under consideration.

References to an "adaptive" inflation system and the like are to be understood to refer to inflatable device inflation wherein selected inflatable devices are inflated or inflated in a manner generally dependent on selected operating conditions such as one or more of ambient temperature, occupant presence, seat belt usage, seat position of the occupant and rate of deceleration of the motor vehicle, for example.

Other objects and advantages will be apparent to those skilled in the art from the following detailed description taken in conjunction with the appended claims and drawings.

BRIEF DESCRIPTION OF THE DRAWINGS

FIG. 2 illustrates the airbag inflator in a normal or a "static" state. FIG. 3 illustrates the airbag inflator shown in FIG. 2 but now at an intermediate point in operation prior to the discharge of inflation gas therefrom. FIG. 4 illustrates the airbag inflator shown in FIG. 3 at a later still point in the operation thereof.

DETAILED DESCRIPTION OF THE INVENTION

Figure 1:
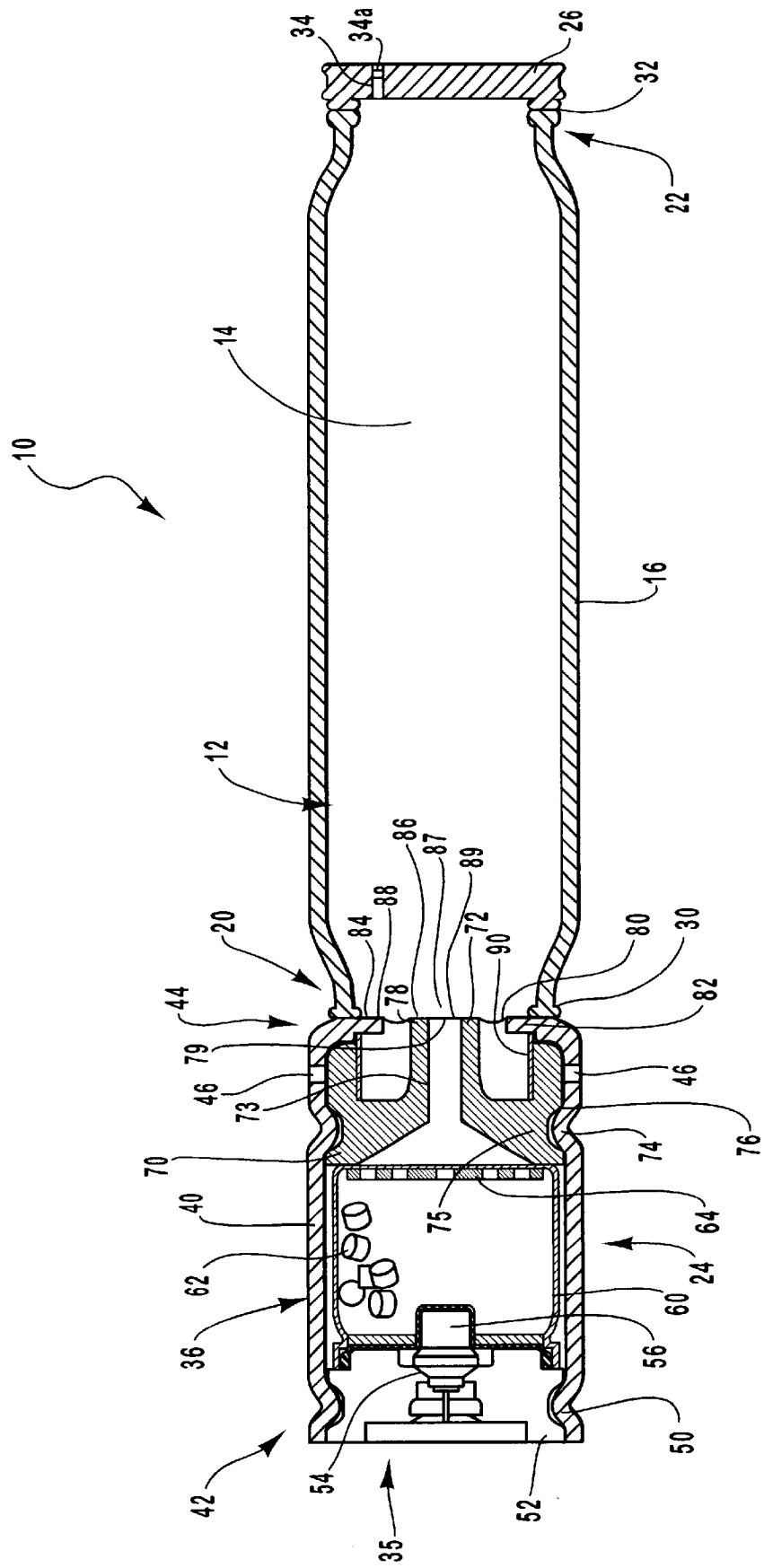
FIG. 1 is a partially in section, schematic drawing of an airbag inflator in accordance with one preferred embodiment of the invention.

The present invention may be embodied in a variety of different structures. As representative, FIG. 1 illustrates the present invention as embodied in an apparatus, generally designated by the reference numeral 10, in accordance with one embodiment of the invention. Such a gas producing or supplying device can advantageously be used to effect the inflation of an inflatable device such as an inflatable vehicle occupant restraint, e.g., an inflatable airbag cushion, (not shown). As described above, such a gas producing or supplying device is commonly referred to as an inflator.

While the invention is described below with particular reference to a passenger side airbag inflator apparatus such as can be used in association with various automotive vehicles including vans, pick-up trucks, and particularly automobiles, it is to be understood that the invention also has applicability not only with other types or kinds of vehicles including, for example, airplanes, and other types or kinds of airbag inflator apparatus for automotive vehicles including, for example, driver side and side impact airbag assemblies but also for the inflation of various inflatable devices such as may be apparent to those skilled in the art. With respect to automotive vehicles it will also be appreciated that due to usual physical differences between passenger, side impact and driver side airbag module assemblies, including the typical difference in size with passenger side airbags generally being much larger than those used in side impact and driver side assemblies, the invention may have particular initial utility in passenger side airbag inflator apparatus. In addition, due to factors such as relatively large volume and extended stand-up times associated with inflatable devices of or in the form of inflatable curtains, inflation devices in accordance with the invention are believed to have particular practicality for use in conjunction with such inflatable devices, as are known in the art.

Returning to FIG. 1, the inflator apparatus 10 includes a first or storage chamber 12 that is filled and pressurized with an expandable fluid, designated by the reference numeral 14. As described in greater detail below, such an expandable fluid is generally effective to provide a gaseous inflation medium such as may be used in the inflation of an associated inflatable device. In particular, such an expandable fluid may typically be in the nature of one or more compressed gases. As will be appreciated, such a compressed gas can be stored in a gaseous, liquid or multi-phase form (i.e., partially gaseous and partially liquid mixture). In view thereof, the first chamber 12 is sometimes referred to herein as a gas/liquid storage chamber or as simply a storage chamber and, in the case of an inflator operating with a dissociative material, a "dissociative" chamber. The premium on size generally placed on modern vehicle design, however, generally results in a preference for smaller sized airbag inflators. In view thereof and the fact that the densities for such compressed gas materials are significantly greater when in a liquid, rather than gaseous form, storage of such compressed gas materials primarily in a liquid form will typically be preferred.

A wide variety of expandable fluids can be used in accordance with various preferred embodiments of the invention. In practice, typical or usual expandable fluids useful in the practice of the invention may take the form or include a fluid under an elevated pressure such that the release of the fluid from the chamber and associated elevated pressure results in volumetric expansion of the fluid. In particular such preferred embodiments of the invention, such expandable fluids may include inert materials such as one or more noble gases such as argon and helium, for example, as well as materials such as nitrogen and carbon dioxide which are essentially inert under such processing conditions or various combinations thereof. In addition, the storage chamber may contain a quantity of gaseous helium to facilitate leak checking of the chamber such as in a manner well known in the art. A specific example of one such expandable fluid mixture or combination is a gaseous mixture composed of 95 mole percent argon and 5 mole percent helium.

In accordance with one particularly preferred embodiment of the invention, an expandable fluid used in the practice of the invention desirably includes or contains a dissociative gas source material. As disclosed in the above-identified Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, the dissociation products produced or formed upon the dissociation of nitrous oxide ideally are nitrogen and oxygen:

$$2N_2O = 2N_2 + O_2 \qquad (2)$$

Thus, not only does such reaction form products which are generally non-toxic and non-corrosive but also results in the production or formation of molecular oxygen. As will be appreciated, such oxygen may then be available for subsequent reaction such as may result in further or enhanced inflation gas production or formation.

It is to be understood that such nitrous oxide can be stored in a gaseous, liquid or multi-phase form (i.e., partially gaseous and partially liquid mixture), as may be desired in particular applications or installations. In view of the above-identified general preference for smaller sized airbag inflators and the fact that the density of nitrous oxide is significantly greater when in a liquid, rather than gaseous form, one preferred embodiment of the invention involves storage of nitrous oxide primarily in a liquid form.

It is also to be understood that while such nitrous oxide dissociative gas source material can be contained within the inflator storage chamber in a pure form (e.g., such that the chamber contents include no more than minor levels of other materials, such as air as may be present in the dissociative chamber prior to being filled with the dissociative gas source material), it may be preferred to include an inert gas therewith. For example, an inert gas such as helium can be included with nitrous oxide to facilitate leak checking of the inflator apparatus or, more specifically, of the dissociative chamber thereof. Alternatively or in addition, an inert gas, such as argon and helium, for example, as well as materials such as nitrogen and carbon dioxide which are essentially inert under such processing conditions or various combinations thereof can be included such as to supplement the gas produced or formed upon the dissociation of the nitrous oxide.

An expandable fluid containing about 50 mole percent nitrous oxide, about 40 mole percent carbon dioxide and about 10 mole percent helium is one specific example of an expandable fluid constituting a liquid and gas mixture in accordance with the invention.

Additionally or alternatively and as disclosed in the above-identified Rink, U.S. Pat. No. 5,884,938, the chamber 12 may contain a quantity of at least one radioactive isotope leak trace material whereby fluid leakage from the chamber can be detected as disclosed in therein.

In addition, if desired, the chamber 12 may additionally contain a quantity of oxygen gas such as in molecular form and such as may either or both beneficially or desirably supplement such molecular oxygen as may be formed upon the dissociation of stored or included nitrous oxide.

Still further, such a chamber 12 can, if and as desired, also include a sensitizer material to promote or accelerate the rate of such dissociative reaction. Various sensitizer materials disclosed and identified in above-identified Rink, U.S. Pat. No. 5,669,629. As disclosed therein, particularly useful sensitizer materials are typically hydrogen-bearing materials. Such sensitizer materials are generally added to the dissociative gas source material in small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen-bearing sensitizer material for use in the practice of the invention.

The chamber 12 has been identified above in terms of a storage chamber for the storage of an expandable fluid. As described in greater detail below, upon actuation and operation of the inflator 10, the chamber 12 may also desirably serve to provide a volume within which communication and heat transfer between combustion products formed in or by the inflator 12 and such stored expandable fluid may desirably occur.

The chamber 12 is defined by an elongated generally cylindrical sleeve 16, such as desirably in the form of an open ended seamless tube. The sleeve 16 includes opposite first and second open ends, 20 and 22, respectively. An assembly, herein denominated a "diffuser assembly", generally designated by the reference numeral 24, is formed or appropriately joined or attached to the sleeve first end 20. A second end closure 26 is formed or appropriately joined or attached to the sleeve second end 22. For example and as shown in FIG. 1, the first sleeve end 20 can be swagged and the diffuser assembly 24 joined thereto such as by means of an inertial weld 30. Similarly, the second sleeve end 22 can be swagged and the second end closure 26 joined thereto such as by means of an inertial weld 32.

The second end closure 26 includes a fill port 34, as is known in the art, wherethrough materials can be passed into the chamber 12. After the storage chamber 12 has been filled, the fill port 34 can be appropriately blocked or plugged, as is known, such as by a pin or ball 34a. As will be appreciated, such a fill port, if included in the inflator apparatus, can alternatively be placed or positioned, as may be desired and understood by those skilled in the art. Thus, the broader practice of the invention is not necessarily limited to the inclusion of a fill port or the position or placement thereof.

The diffuser assembly 24 is a multi-component assembly such as may, at least in part, serve as, contain or hold a chamber opener 35, such as described in greater detail below and such as actuatable to produce a discharge effective to open the first chamber 12 by non-mechanical means, i.e., a discharge effective to open the first chamber 12 without necessitating the use of or reliance on mechanical opening devices such as projectiles or piston members, for example. In particular embodiments of the invention, such a discharge may be or take the form of a shock wave or other pressure disturbance, a hot product gas or other elevated temperature discharge or various combinations thereof, for example and as will be appreciated by those skilled in the art and guided by the teachings herein provided.

More specifically, the diffuse assembly 24 includes a housing 36 such as in the general form of a hollow tube side wall 40 having open first and second ends, 42 and 44, respectively. The side wall 40 includes a plurality of exit ports 46, wherethrough the inflation gas from the inflator 10 and, particularly the diffuser assembly 24, is properly dispensed into an associated airbag cushion (not shown). Thus, the diffuser assembly 24 can serve to facilitate direction and ballistic control of the inflation fluid from the inflator 10 into the associated inflatable airbag cushion. As will be appreciated by those skilled in the art, the number and positioning of placement of the exit ports can be selected to provide particular inflation performance characteristics required or desired in or of a particular inflator installation. In practice, four generally evenly circumferentially spaced exit ports have been found sufficient to generally provide a sufficiently even flow control of the inflation medium, from the inflator into an associated airbag cushion and such as may facilitate the desired inflation thereof.

To the housing first end 42, there is fitted or attached, such as by means of a crimp 50, a first end closure 52. The first end closure 52 includes an opening 54 therein wherethrough an initiator device 56 such as forms, at least in part, a portion of the chamber opener 35, is appropriately attached. Particular initiator devices for use in the practice of the invention can include any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a suitable pyrotechnic charge.

The diffuser assembly 24 further includes, such as a part of the chamber opener 35, a generant canister 60. The generant canister 60 may advantageously be situated adjacent the first end closure 52 and particularly the initiator device 56, such as to facilitate the direct communication therewith by the initiator device 56 upon the actuation thereof. Such a generant canister 60 can desirably be formed of a metal, such as steel, copper, brass, aluminum or the like, for example. Further, such metal material of construction may, if desired, include a suitable coating such as to provide increased corrosion resistance, for example. In accordance with one preferred embodiment of the invention, a generant canister formed of steel with a tin coating has been found desirable and useful.

Within the generant canister 60 there is housed a charge, quantity or supply of a selected reactable gas generant material, such as represented by the solid pyrotechnic gas generant pellets, generally designated by the reference numeral 62. Gas generant materials for use in the practice of the invention can suitably take various forms including wafer, pellet and grain forms, for example. As described in greater detail below, in accordance with one preferred embodiment of the invention, the reactable gas generant material is reacted to form reaction products effective to rupture the generant canister and, upon heat transfer communication with the expandable fluid, result in the expansion of the fluid such as to form an inflation medium for the inflation of an associated airbag cushion.

Various reactable gas generant materials, such as known in the art, can be used in the practice of the invention. In particular, those materials which produce a relatively large proportion of gaseous products and/or combust to produce a solid slag residual particulate mass which is relatively easily removable are generally preferred.

Preferred gas generant materials for use in the practice of the invention can desirably include or contain a combustible fuel and oxidizer combination. In accordance with one preferred embodiment of the invention, the fuel is preferably composed of an organic compound that is rich in nitrogen and oxygen content as such fuel materials can desirably reduce the amount of oxidizer required for combustion thereof. Specific examples of materials useful as such fuels include but are not limited to: guanidine nitrate, aminoguanidine nitrate, diamminoguanidine nitrate, triaimnoguanidine nitrate, nitroguanidine, and nitrotriazalone; tetrazoles, bitetrazoles, and triazoles, and combinations thereof. In addition, transition metal nitrate, chlorate, or perchlorate complexes of organic compounds may be used as fuels. It is to be understood and appreciated that the fuel component of such gas generant materials may constitute one or more of such fuel materials, as may be desired for particular applications. In general, the fuel component will comprise about 10 to about 90 weight percent of the gas generant material formulation.

Specific examples of preferred oxidizer component materials for use in the practice of the invention include but are not limited to one or more of the following materials: ammuonium nitrate, ammonium perchlorate, transition metal ammine nitrates, chlorates, and perchlorates; alkaline earth metal peroxides, nitrates, perchlorates, and chlorates; transition metal peroxides, nitrates, and perchlorates and alkali metal nitrates, chlorates, and perchlorates. In general, the oxidizer component will comprise about 20 to about 80 weight percent of the formulation.

In addition to fuel and oxidizer components such as described above, gas generant materials for use in the practice of the invention may desirably contain one or more additives such as to provide or result in improved processing, enhanced slag formation and reduced undesirable effluent gas production or release. Exemplary processing aids include but are not limited to organic binders, such as PVC, guar gum, polyacrylamide, polyacrylic acid, polyvinyl alcohol, etc. Preferred pressing processing aids include but are not limited to mica, calcium stearate, graphite, molybdenum disulfide, etc. Enhanced slag formation additives include but are not limited to silica, alumina, titania, zirconia, clays, and talcs. Additives useful in reducing undesirable effluent gases include but are not limited to alkali metal salts and alkali metal salts or transition metal complexes of tetrazoles and related nitrogen heterocylces. In practice, the content of such additives in the preferred gas generant formulations used in the practice of the invention generally does not exceed about 20 weight percent of the formulation.

In addition, gas generant compositions used in the practice of the invention may advantageously be coated with an ignition compound to increase the ignitability of the formulation, if desired. Useful ignition compounds typically include or contain a metal or metal hydride fuel such as boron, magnesium, aluminum, titanium hydride, or the like and an oxidizer typically an alkaline earth metal oxide, hydroxide, peroxide, nitrate, chlorate or perchlorate or alkali metal nitrate, chlorate, or perchlorate. In practice, igniter levels of about 1 to about 5 percent of the finished pyrotechnic composition on a weight basis have been found useful in particular embodiments of the invention.

While the utilization and inclusion of such a gas generant canister or housing 60 can facilitate inflator assembly and handling during processing, it is to be understood that the broader practice of the invention is not necessarily so limited. For example, the invention can, if desired, be practiced using an inflator wherein a selected gas generant material is directly or otherwise appropriately placed and contained within an associated diffuser housing.

The diffuser assembly 24 may, as shown, also include a combustion screen 64 or the like such as to screen or otherwise separate and desirably remove larger sized particulate material such as may form upon reaction of the reactable gas generant material. If included, such a combustion screen can be contained within the generant canister 60, as shown. Alternatively, such a combustion screen can be included within such a diffuser assembly externally adjacent the gas generant canister or otherwise downstream of the gas generant material.

The diffuser assembly 24 further includes, such as adjacently positioned relative to the generant canister 60, a flow control element 66. In this illustrated embodiment, the flow control element 66 includes a base portion 70, a neck portion 72 and forms a fluid flow conduit 73, such as in the form of a nozzle. In the illustrated embodiment, the flow control element 66 is secured within the diffuser assembly 24 by means of a crimp 74 formed by the diffuser housing 36 adjacent the flow control element base portion 70. In particular, the flow control element base portion 70 forms an indentation 75 along the outer wall 76 thereof. The indentation 75 is adapted to receive or otherwise cooperate with the diffuser housing crimp 74 such as to desirably secure the flow control element 66 within the diffuser assembly 24 in a non-movable manner.

In the particularly illustrated embodiment, the fluid flow conduit 73 is in the form of a nozzle having a discharge end 78 forming or having a discharge opening 79 wherethrough at least a portion of the discharge from the chamber opener 35, e.g., reaction products formed upon reaction of the reactable gas generant material 62 are desirably directed and transmitted into chamber-opening communication with the first chamber 12 and, in turn, communication with the expandable fluid 14 contained therewithin.

The first chamber 12 is enclosed at the sleeve first end 20 by means of a burst disk 80. As shown in FIG. 1, the housing second end 44 includes or has formed thereat a rupture disk support collar 82 whereto the burst disk 80 can desirably be sealed around the perimeter region thereof, generally designated by the reference numeral 84, such as to desirably provide a leak-free seal for the expandable fluid 14 normally contained or stored within the chamber 12. The burst disk 80, at a center portion 86 thereof, is desirably supported at least in part by the flow conduit discharge end 78.

In practice, the burst disk 80 is typically in the form of a thin disk such as fabricated or formed of a metal material such as Inconel 600 or Inconel 625. In practice, such a disk may typically have a thickness in the range of about 0.005 inch (0.127 mm) to about 0.010 inch (0.254 mm), for example.

It is to be understood that a disk support arrangement such as described above can advantageously result in the use of a burst disk of reduced thickness as compared to similar arrangements but wherein the associated disk lacks such support features. As will be appreciated, the use of a disk of reduced thickness can facilitate the desired rupture or opening of the disk, as described in greater detail below.

Under high pressure proof testing such as pressures in the range of about 4500 psi (31.0 MPa) to about 6000 psi (41.4 MPa), the disk 80 deforms against the support provided by the flow conduit discharge end 78 such as to provide or result in a first sealing portion 87. Such burst disk deformation desirably results in the disk 80 seating tightly against the flow conduit discharge end 78. Such tight seating of the disk 80 against the flow conduit discharge end 78 has been found to favorably influence the direct opening of the burst disk 80 such as via the impingement thereon of the reaction products produced by or resulting from the chamber opener 56, such upon the reaction of the gas generant material 62 contained within the diffuser assembly 24. In particular, such tight seating has in practice been found reliably sufficient whereby the direct physical joining of the burst disk to the flow conduit discharge end such as by means of an additional weld joinder is generally not required in order for the assembly to reliably result in the gas generant reaction products to be directed into the chamber 12 rather than, for example, flowing directly out of the diffuser assembly 24 such as via the exit ports 46 without first entering into the chamber 12. The avoidance of the need for an additional weld joinder at the center portion 86 simplifies and reduces manufacturing costs and can beneficially effect reliability associated with the manufacture and operation of the resulting inflator apparatus. It is to be understood, however, that the burst disk can, if desired, be joined or attached with or to the nozzle such as by being welded, brazed or bonded thereto, for example.

The disk 80 also deforms against the support provided by the support collar 82 and, as identified above, can be sealed around the perimeter region of disk such as to provide or result in a second sealing portion 88.

It will be appreciated that the burst disk can, if desired, include a score 89 such as to facilitate the desired opening of the burst disk. More specifically, the inclusion of such a score can be helpful in more specifically locating or positioning the site at which the burst disk 80 will initially open upon the direction of the gas generant reaction products from the fluid flow conduit 73 thereagainst.

As will be appreciated, such burst disk scoring can take various forms such as known in the art. For example, such a burst disk may include a score in the form of a cross or a circle, such as may be desired or particularly suited for a specific installation. Further, such a score may take the form of an indentation, marking or otherwise reduction in the thickness of the burst disk at selected area or portion thereof, as is known in the art.

If desired and as shown, the diffuser assembly 24 may additionally include a screen 90 or like device interposed between the burst disk 80 and the exit ports 46. As will be appreciated, the inclusion of such a screen or like device may be desired or helpful in removing undesired particulates and the like from the inflation gas prior to passage out of the inflator 10, through the exit ports 46.

Figure 2:
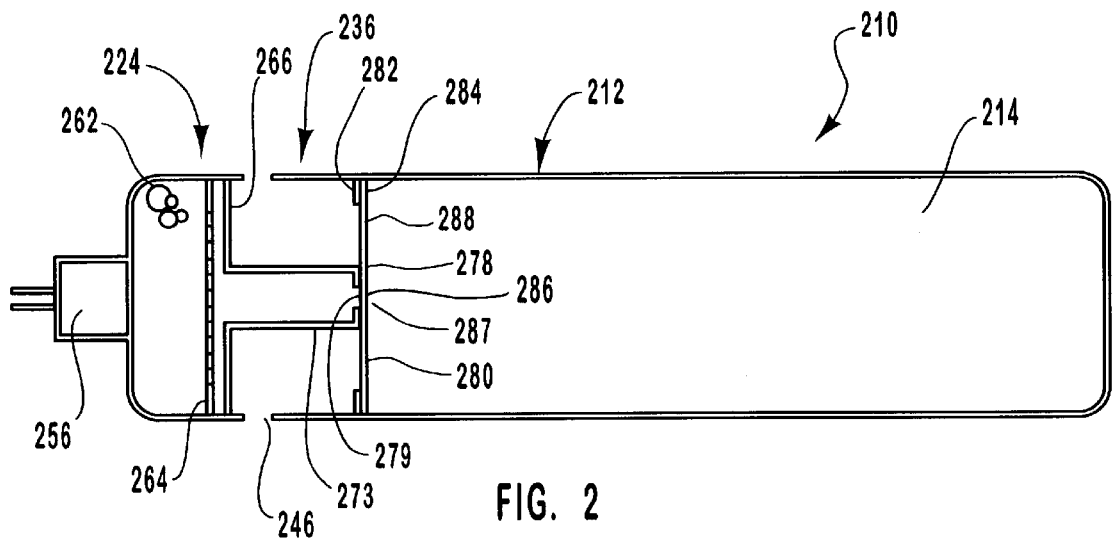
FIGS. 2–4 are simplified, partially in section, schematic drawings illustrating sequential operation of an airbag inflator in accordance with one embodiment of the invention. More specifically.
Figure 3:
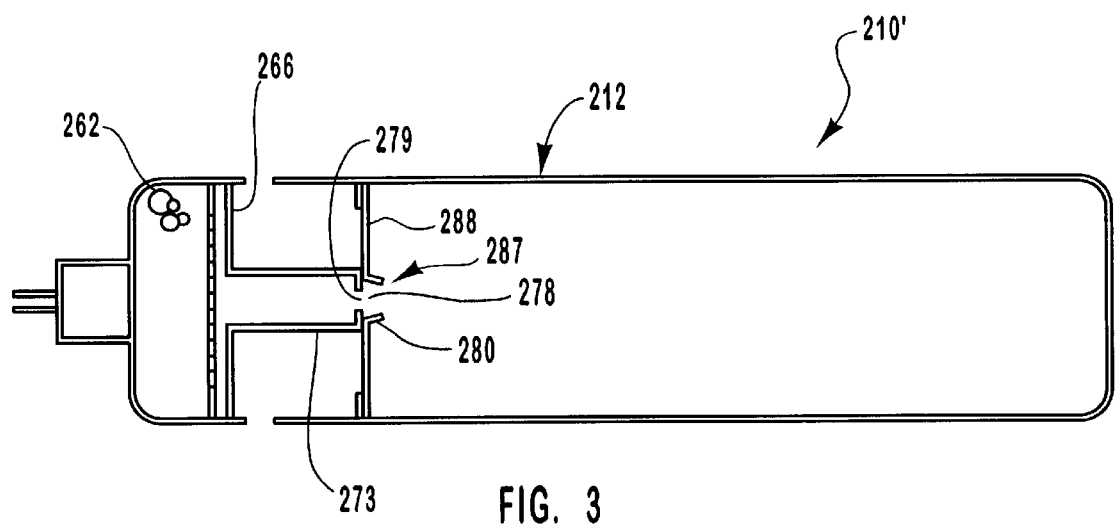
Figure 4:
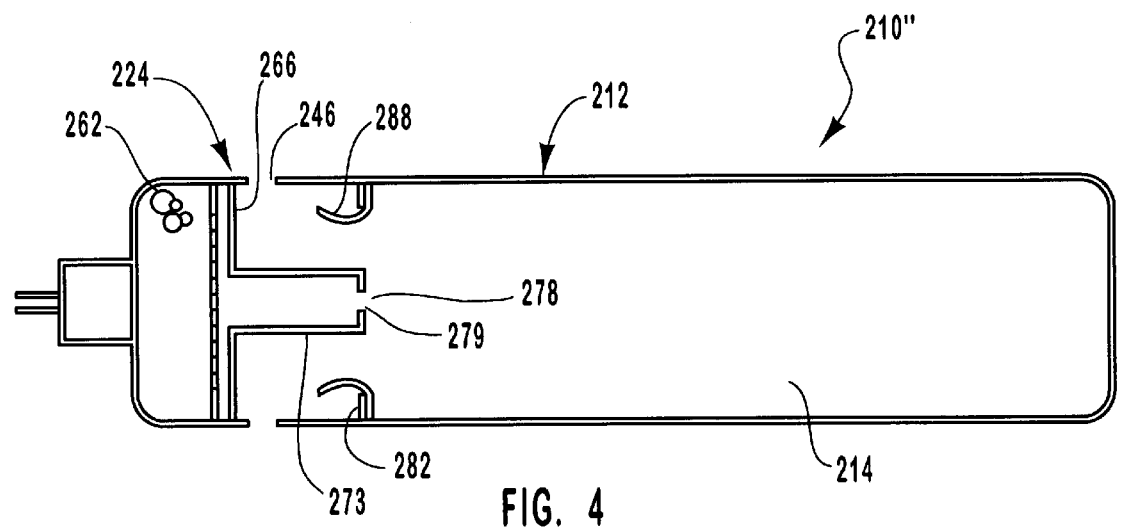

The manner of operation of an inflator apparatus in accordance with the invention will now be described in greater detail making reference to FIGS. 2–4. More specifically, FIGS. 2–4 schematically illustrate an inflator apparatus in accordance with one preferred embodiment of the invention at various selected points in the operation process thereof. In particular, FIG. 2 illustrates the inflator apparatus 210 in a "static" or what may be termed its normal state, similar to that shown in FIG. 1. FIG. 3 illustrates the same inflator apparatus (now designated 210') at an intermediate point in operation subsequent to actuation and prior to the discharge of inflation gas therefrom. FIG. 4 illustrates the same inflator apparatus (now designated by the reference numeral 210") at a subsequent or still later point in the operation thereof.

The inflator apparatus 210, as shown in FIG. 2, is generally the same as the inflator apparatus 10 shown in FIG. 1 and described above. For example, the inflator apparatus 210 includes a first chamber 212 filled and pressurized with an expandable fluid 214. The inflator apparatus 210 also includes a diffuser assembly 224 adjacent the first chamber 212.

The diffuser assembly 224 includes a housing 236 having plurality of exit ports 246, a chamber opener 256, such as at least in part in the form of an initiator device, a quantity or supply of a selected reactable gas generant material 262, a combustion screen 264, a flow control element 266 such as includes a fluid flow conduit 273 such as in the form of a nozzle and having a discharge end 278 forming or having a discharge opening 279 wherethrough reaction products formed upon reaction of the reactable gas generant material are desirably directed and transmitted into communication with the first chamber 212 and a burst disk 280. As shown, a rupture disk support collar 282 desirably provides support to a perimeter region 284 of the burst disk 280.

As described above relative to the embodiment illustrated in FIG. 1, the burst disk 280, at a center portion 286 thereof, is desirably supported by the flow conduit discharge end 279. Further, the burst disk 280 in cooperation with the flow conduit 273 forms a first sealing portion 287. Also, the disk support collar 282 provides a base to which the burst disk 280 can desirably be sealed such as to provide a leak-free seal for the expandable fluid normally contained or stored within the chamber 212. Further, the burst disk 280 in association with the support collar 282 forms a second sealing portion 288.

As will be appreciated, in FIGS. 2–4, certain simplifications have been made to simplify illustration and discussion. For example, FIGS. 2–4 do not illustrate the inclusion of various welds or crimps such as may desirably be utilized in the joining together of the component parts of the inflator device. Further, FIGS. 2–4 do not illustrate the inclusion of a gas generant canister such as described above relative to the inflator apparatus 10.

Operation

Typical operation of the inflator apparatus 210, shown in FIG. 2, is as follows:

Upon the sensing of a collision, an electrical signal is sent to the chamber opener initiator 256. The initiator 256 functions to ignite the gas generant material 262. The gas generant material 262 reacts, e.g., burns, to produce or form gaseous reaction products. The gaseous reaction products are passed through the screen 264, to the flow control element 266 and into the fluid flow conduit 273.

The conduit 273 directs the gas generant reaction products formed by or from the gas generant material 262 at or to the burst disk 280 resulting, as shown in FIG. 3, in the opening of the central portion 287 of the burst disk 280 when the pressure against the burst disk rises to a predetermined level or range. More specifically, the burst disk central portion 287 such as formed or positioned adjacent the flow conduit discharge end 278 and the opening 279 thereat, desirably ruptures or otherwise opens into or towards the first chamber 212.

With the rupture or otherwise opening of the diffuser assembly-supported burst disk central portion 287, the pressure within the first chamber 212 desirably results to result in initial opening of the burst disk second sealing portion 288. More specifically, the edges of the burst disk second sealing portion 288 desirably petal or otherwise open into or towards the diffuser assembly 224, as shown in FIG. 4.

With such opening of the burst disk second sealing portion 288, a portion of the quantity of unheated expandable fluid 214 contained within the first chamber 212 is released from the first chamber. In particular, such released fluid is passed into the diffuser assembly 224 between the flow control element 266 and the disk support collar 282 and ultimately out the exits ports 246 into an associated inflatable vehicle occupant restraint (not shown).

Simultaneously with such opening of the burst disk second sealing portion 288, hot product gases produced upon combustion of the gas generant material 262, flow into the first chamber 212 via the flow conduit 273. As will be appreciated, the combustion products entering into the first chamber 212 must overcome the pressure gradient created by the expandable fluid originally contained within the first chamber 212. Based on the teachings and guidance herein provided, conduit or nozzle design parameters such as including the exit area thereof can be selected or determined based on factors such as anticipated storage conditions within the chamber 212.

As described above, the hot gases contact and communicate with the remaining expandable fluid contained within the first chamber 212 resulting in the heating of such fluid and the increasing of the temperature of such fluid. The heated fluid and products formed or associated therewith are correspondingly passed or communicated with or through the diffuser assembly 224 and ultimately out the exits ports 246 into the associated inflatable vehicle occupant restraint.

Figure 5:
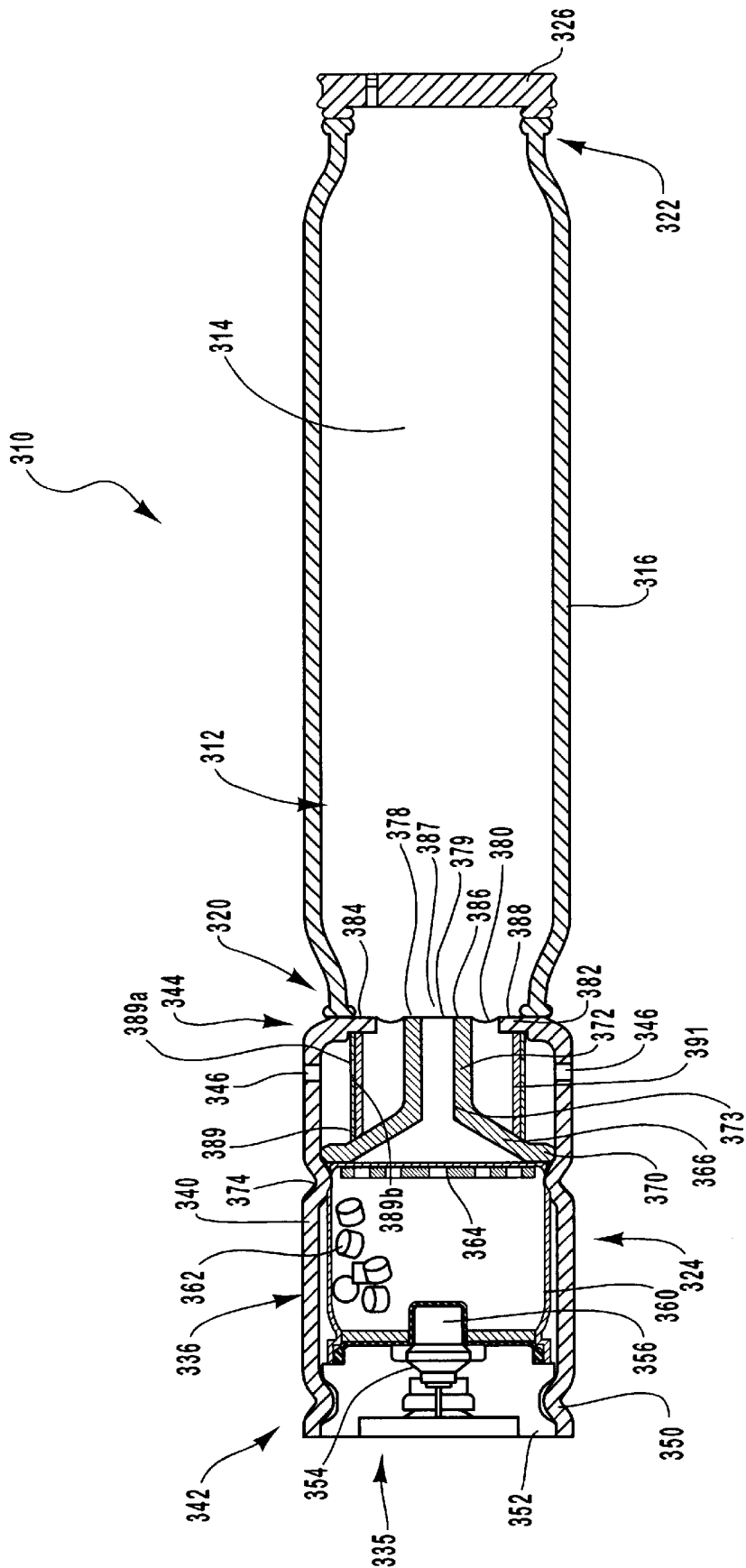
FIG. 5 is a partially in section, schematic drawing of an airbag inflator in accordance with another preferred embodiment of the invention.
Figure 6:
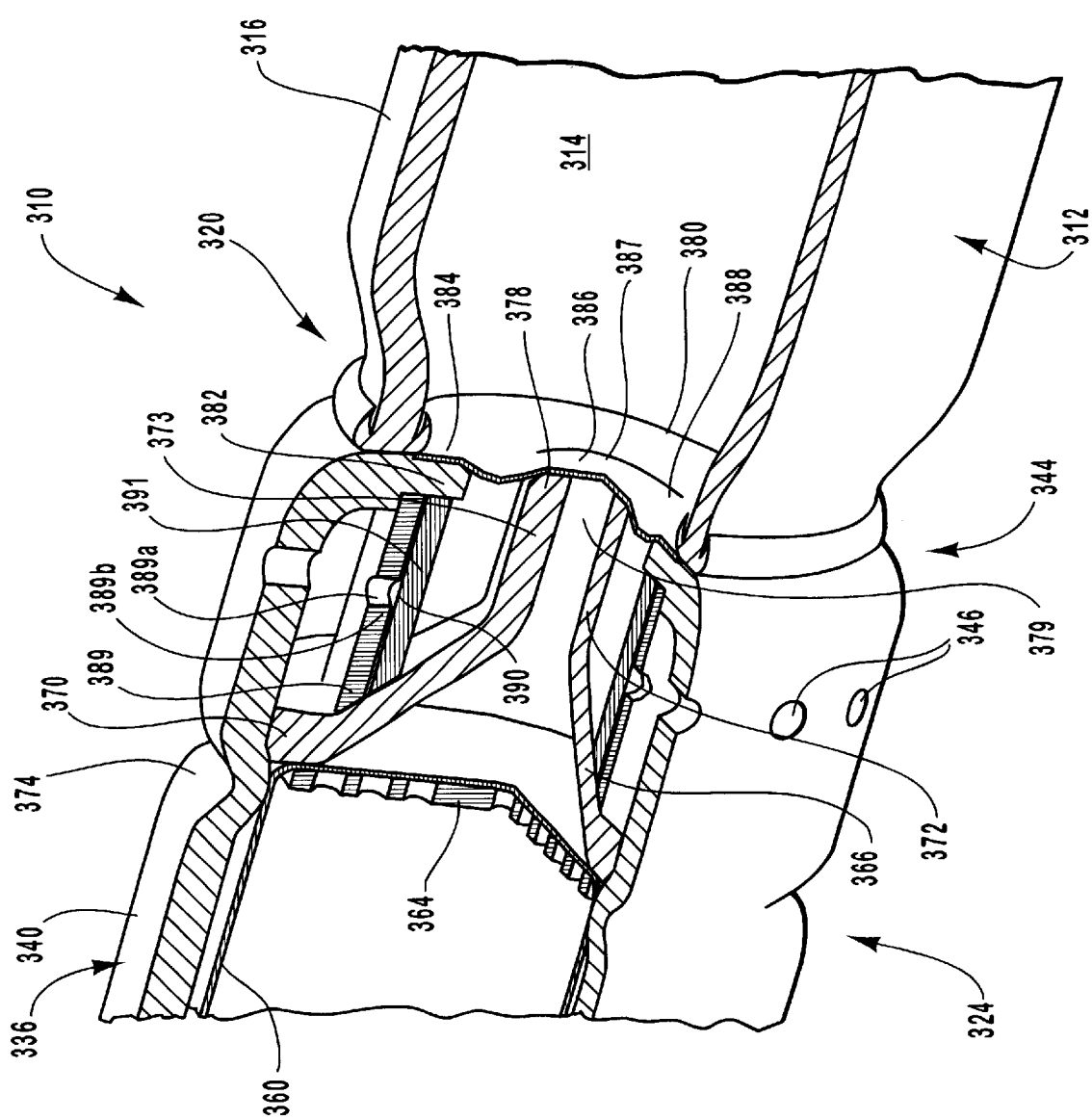
FIG. 6 is a fragmentary perspective of the airbag inflator shown in FIG. 5.

Turning now to FIGS. 5 and 6, there is illustrated is in FIG. 5 an airbag inflator, generally designated by the reference numeral 310, in accordance with another preferred embodiment of the invention and in FIG. 6 a selected fragmentary portion or section of the airbag inflator 310.

The airbag inflator 310 is generally similar to the inflator 10 described above in that it includes a first or storage chamber 312 that is filled and pressurized with an expandable fluid 314 effective to provide a gaseous inflation medium, such as described above. The chamber 312 is defined by an elongated generally cylindrical sleeve 316 which includes opposite first and second open ends, 320 and 322, respectively. A diffuser assembly 324 is formed or appropriately joined or attached to the sleeve first end 320 and a second end closure 326 is formed or appropriately joined or attached to the sleeve second end 322, such as described above.

The diffuser assembly 324 serve as, contains or holds a chamber opener 335, such as described above and such as actuatable to produce a discharge effective to open the first chamber 312 by non-mechanical means. More specifically, the diffuser assembly 324 includes a housing 336 such as in the general form of a hollow tube side wall 340 having open first and second ends, 342 and 344, respectively. The side wall 340 includes a plurality of exit ports 346, wherethrough the inflation gas from the inflator 310 and, particularly the diffuser assembly 324, is properly dispensed into an associated airbag cushion (not shown).

To the housing first end 342, there is fitted or attached, such as by means of a crimp 350, a first end closure 352. The first end closure 352 includes an opening 354 therein, wherethrough an initiator device 356, such as described above and such as forms, at least in part, a portion of the chamber opener 335, is appropriately attached.

The diffuser assembly 324 further includes, such as a part of the chamber opener 335, a generant canister 360, such as described above. Within the generant canister 360 there is housed a charge, quantity or supply of a selected reactable gas generant material 362 such as described above and such as may be reacted to form reaction products effective to rupture the generant canister and, upon heat transfer communication with the expandable fluid, result in the expansion of the fluid such as to form an inflation medium for the inflation of an associated airbag cushion.

The diffuser assembly 324 may, as shown, also include a combustion screen 364 or the like. As described above, it may be desirable to include such a device to screen or otherwise separate and desirably remove larger sized particulate material such as may be formed upon reaction of the reactable gas generant material contained therewithin. Also, such a combustion screen can be contained within the generant canister or within such a diffuser assembly externally adjacent a gas generant canister or otherwise downstream of the gas generant material, as may be desired and as described above.

The diffuser assembly 324 further includes, such as adjacently positioned relative to the generant canister 360, a flow control element 366. In this illustrated embodiment, the flow control element 366 includes a base portion 370, a neck portion 372 and forms a fluid flow conduit 373, such as in the form of a nozzle. In the illustrated embodiment, the flow control element 366 is secured within the diffuser assembly 324 by means of a crimp 374 formed by the diffuser housing 336 adjacent the flow control element base portion 370, such as to prevent movement of the flow control element 366 in a direction towards the generant canister 360 such as due to application thereagainst of force exerted by the pressurized contents of the storage chamber 312.

The fluid flow conduit 373 is in the form of a nozzle having a discharge end 378 forming or having a discharge opening 379 wherethrough at least a portion of the discharge from the chamber opener 335, e.g., reaction products formed upon reaction of the reactable gas generant material 362 are desirably directed and transmitted into communication with the first chamber 312 and, in turn, the expandable fluid 314 contained therewithin.

Similar to the inflator apparatus 10 described above, in the airbag inflator 310, the first chamber 312 is enclosed at the sleeve first end 320 by means of a burst disk 380. The housing second end 344 includes or has formed thereat a rupture disk support collar 382 whereto the burst disk 380 can desirably be sealed around the perimeter region thereof, generally designated by the reference numeral 384, such as to provide a leak-free seal for the expandable fluid 314 normally contained or stored within the chamber 312. The burst disk 380, at a center portion 386 thereof, is desirably supported at least in part by the discharge end 378 of the fluid flow conduit 373.

Under high pressure proof testing, the disk 380 deforms against the support provided by the flow conduit discharge end 378 such as to provide or result in a first sealing portion 387. As described above, such burst disk deformation desirably results in the disk 380 seating tightly against the flow conduit discharge end 378 such has been found to favorably influence the direct opening of the burst disk 380 such as via the impingement thereon of the reaction products produced by or resulting from the chamber opener 356, such upon the reaction of the gas generant material 362 contained within the diffuser assembly 324.

The disk 380 also deforms against the support provided by the support collar 382 and, as identified above, can be sealed around the perimeter region of disk such as to provide or result in a second sealing portion 388.

The diffuser assembly 324 also includes an orifice ring 389, such as described in greater detail below, interposed between the flow control element base portion 370 and the rupture disk support collar 382, for example. The orifice ring 389 includes or has formed therein a plurality of flow orifices 389a such as may desirably serve as throttling orifices for the flow of inflation fluid therethrough and out of the inflator 310.

As will be appreciated, the inclusion of such an orifice ring member can serve to prevent or limit possible longitudinal movement, within the assembly 310, by the flow control element 366 such as may otherwise occur as a result of reaction of the gas generant material contained therewithin, for example. More specifically, the inclusion of such an orifice ring member can serve to avoid, prevent or limit possible longitudinal movement of the flow control element 366 such as may otherwise hinder or prevent discharge of inflation fluid through the exit ports 346. In practice, orifice ring members constructed of a material such as a metal such as aluminum or stainless steel can be useful in fulfilling such a structural function.

Thus, in such embodiment, it will be appreciated that the crimp 374 and the orifice ring 389 can desirably serve to secure the flow control element 366 within the apparatus 310 in a non-movable manner, at least in the longitudinal direction.

If desired and as shown, one or more and preferably each of the orifice ring flow orifices 389a is covered by a pressure-sensitive covering 390, such as in the form of a metal foil or the like, such as shown in FIG. 6. Such orifice coverings 390, such as applied or the interior surface 389b of the orifice ring 389, may beneficially serve to normally prevent passage of fluid through an associated flow orifice 389a until such time as a predetermined sufficient inflation fluid pressure is applied thereagainst. In particular, the inclusion of such a covering 390 for each orifice ring flow orifice 389a can serve to better ensure rupture or opening of the burst disk 380 prior to passage of any significant quantity of fluid through an associated flow orifice 389a. For example, reliable burst disk operation can be provided even in the event of the pressure within the storage chamber 314 being relatively low such as may occur in association with low temperature inflator operation wherein the expandable fluid is in the form of a liquefied gas and in the case of the burst disk 380 not welded or otherwise joined or attached to the conduit discharge end 378.

While orifice coverings of various constructions and materials can be used, metal foils such as of steel, copper or preferably aluminum have been found useful. Further, while such orifice coverings or the like need not fixedly secured within a particular inflator assembly, the securing of such a covering such as by means of an adhesive backing can advantageously be employed to better ensure proper placement and positioning of the covering within the assembly until the desired time of actuation and use of the assembly.

In addition, the diffuser assembly 324 may additionally include a screen 391 or like device interposed in the fluid flow path between the burst disk 380 and the flow orifices 389a. As will be appreciated, the inclusion of such a screen or like device may be desired or helpful in removing undesirable particulates and the like from the inflation gas prior to passage out of the inflator 310.

Figure 7:
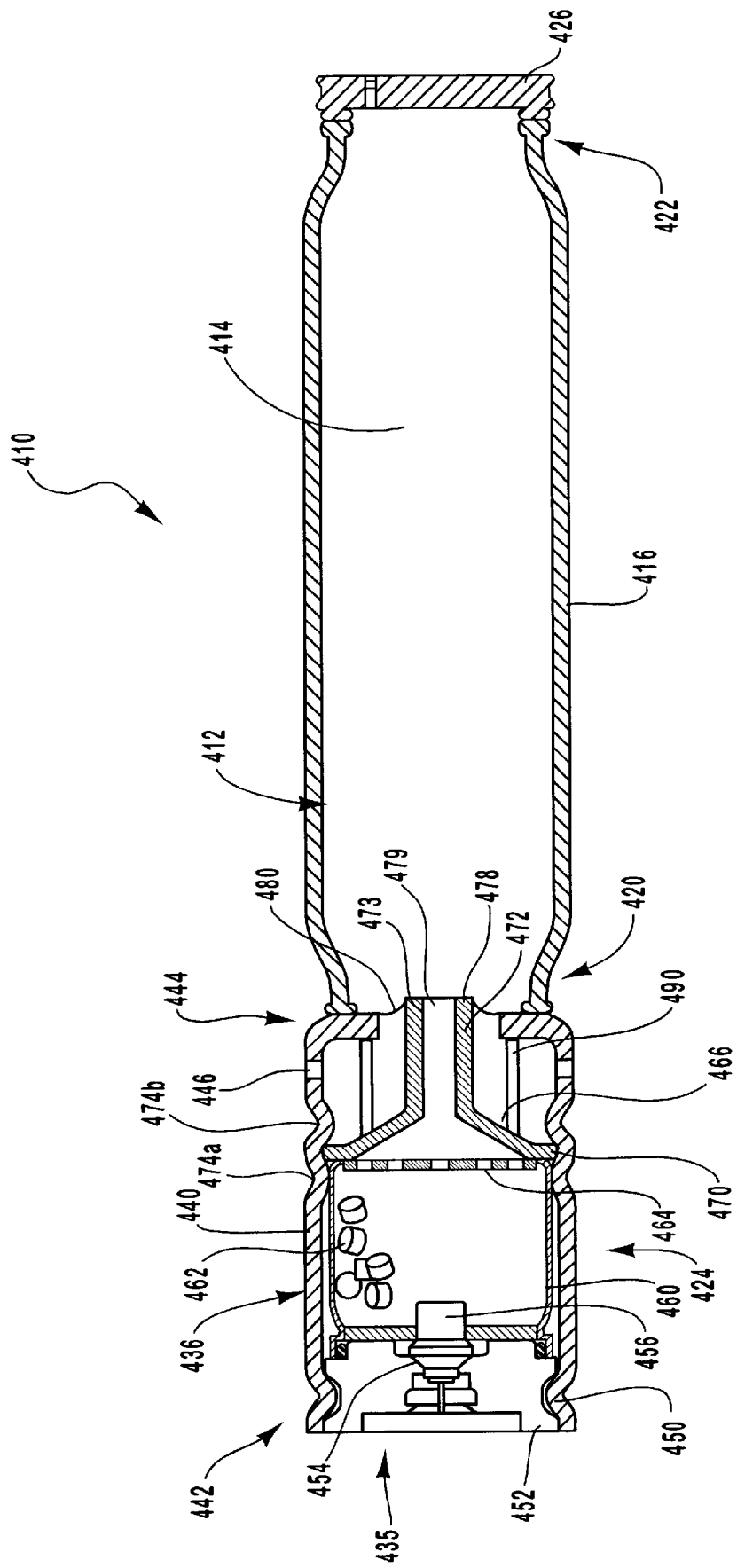
FIGS. 7–10 are each partially in section, schematic drawings of airbag inflators in accordance with alternative preferred embodiments of the invention.

FIG. 7 illustrates an airbag inflator 410 in accordance with an alternative preferred embodiment of the invention. The inflator 410, similar to the inflators 10 and 310 described above, includes a first or storage chamber 412 that is filled and pressurized with an expandable fluid 414 effective to provide a gaseous inflation medium.

The chamber 412 is defined by an elongated generally cylindrical sleeve 416 which includes opposite first and second open ends, 420 and 422, respectively. A diffuser assembly 424 is formed or appropriately joined or attached to the sleeve first end 420 and a second end closure 426 is formed or appropriately joined or attached to the sleeve second end 422.

The diffuser assembly 424 serve as, contains or holds a chamber opener 435, such as described above to be actuatable to produce a discharge effective to open the first chamber 412 by non-mechanical means. The diffuser assembly 424 includes a housing 436 such as in the general form of a hollow tube side wall 440 having open first and second ends, 442 and 444, respectively. The side wall 440 includes a plurality of exit ports 446, wherethrough the inflation gas from the inflator 410 and, particularly the diffuser assembly 424, is properly dispensed into an associated airbag cushion (not shown). To the housing first end 442, there is fitted or attached, such as by means of a crimp 450, a first end closure 452. The first end closure 452 includes an opening 454 therein, wherethrough an initiator device 456, such as described above and such as forms, at least in part, a portion of the chamber opener 435, is appropriately attached.

The diffuser assembly 424 further includes, such as a part of the chamber opener 435, a generant canister 460, such as described above, and such as wherein is housed a charge, quantity or supply of a selected reactable gas generant material 462 such as described above and such as may be reacted to form reaction products effective to rupture the generant canister and, upon heat transfer communication with the expandable fluid, result in the expansion of the fluid such as to form an inflation medium for the inflation of an associated airbag cushion.

The diffuser assembly 424 also includes a combustion screen 464 and a flow control element 466 which includes a base portion 470, a neck portion 472 and forms a fluid flow conduit 473, such as in the form of a nozzle. In the illustrated embodiment and as described in greater detail below, the flow control element 466 is secured within the diffuser assembly 424 by means of first and second crimps 474a and 474b formed by the diffuser housing 436 adjacent the flow control element base portion, such as to prevent movement of the flow control element 466 in a direction towards the generant canister 460 such as due to application thereagainst of force exerted by the pressurized contents of the storage chamber 412 and such as to prevent movement of the flow control element 466 in a direction towards the generant canister 460 such as due to application thereagainst of force exerted by the reaction products of the gas generant material 462.

As will be appreciated, such a double crimp inflator design permits the flow control element for use in association therewith to be fabricated of lighter steel and such as formed by a simple stamping process. As a result, the weight of the assembly and fabrication costs associated therewith can desirably be significantly reduced.

The fluid flow conduit 473 is in the form of a nozzle having a discharge end 478 forming or having a discharge opening 479 wherethrough at least a portion of the discharge from the chamber opener 435, e.g., reaction products formed upon reaction of the reactable gas generant material 462 are desirably directed and transmitted into communication with the first chamber 412 and, in turn, the expandable fluid 414 contained therewithin.

Similar to the inflator apparatus 10 described above, in the airbag inflator 410, the first chamber 412 is enclosed at the sleeve first end 420 by means of a burst disk 480. Also, similar to the inflator apparatus 10 described above, if desired and as shown, the diffuser assembly 424 may additionally include a screen 490 or like device, interposed between the burst disk 480 and the exit ports 446, and such as may be desired or helpful in removing undesired particulates and the like from the inflation gas prior to passage out of the inflator 410, through the exit ports 446.

In the inflator apparatus 410, the discharge end 478 of the fluid flow conduit 473 is shown as extending or protruding further into the associated first chamber 412 than in previously described embodiments and thus such embodiment is sometimes referred to as a "penetrated nozzle" design. With such a penetrating nozzle, the associated burst disk 480 can advantageously be placed under a higher degree of stress within the completed inflator apparatus 410 such as may serve to better ensure the repeatability of rupture or opening conditions, such as rupture pressure, associated with the burst disk 480. Thus, resulting or providing an inflator apparatus which better provides or results in repeatable performance under typical design conditions.

Further, as will be appreciated, such extension, protrusion or penetration of the flow conduit or nozzle 473 into the chamber 412 can advantageously help better ensure desired contact and mixing of discharge products of the chamber opener 435 with the expandable fluid 414 originally contained within the chamber 412. Such improved contact and mixing can be especially desirable and advantageous when improved thermal contact between such discharge products and stored contents is sought, as will typically be desired when the chamber opener is designed to provide hot discharge products such as including gas generant reaction products. Such increased or improved contact and mixing may thus also assist in better ensuring repeatable performance of such designed inflator apparatus.

Figure 8:
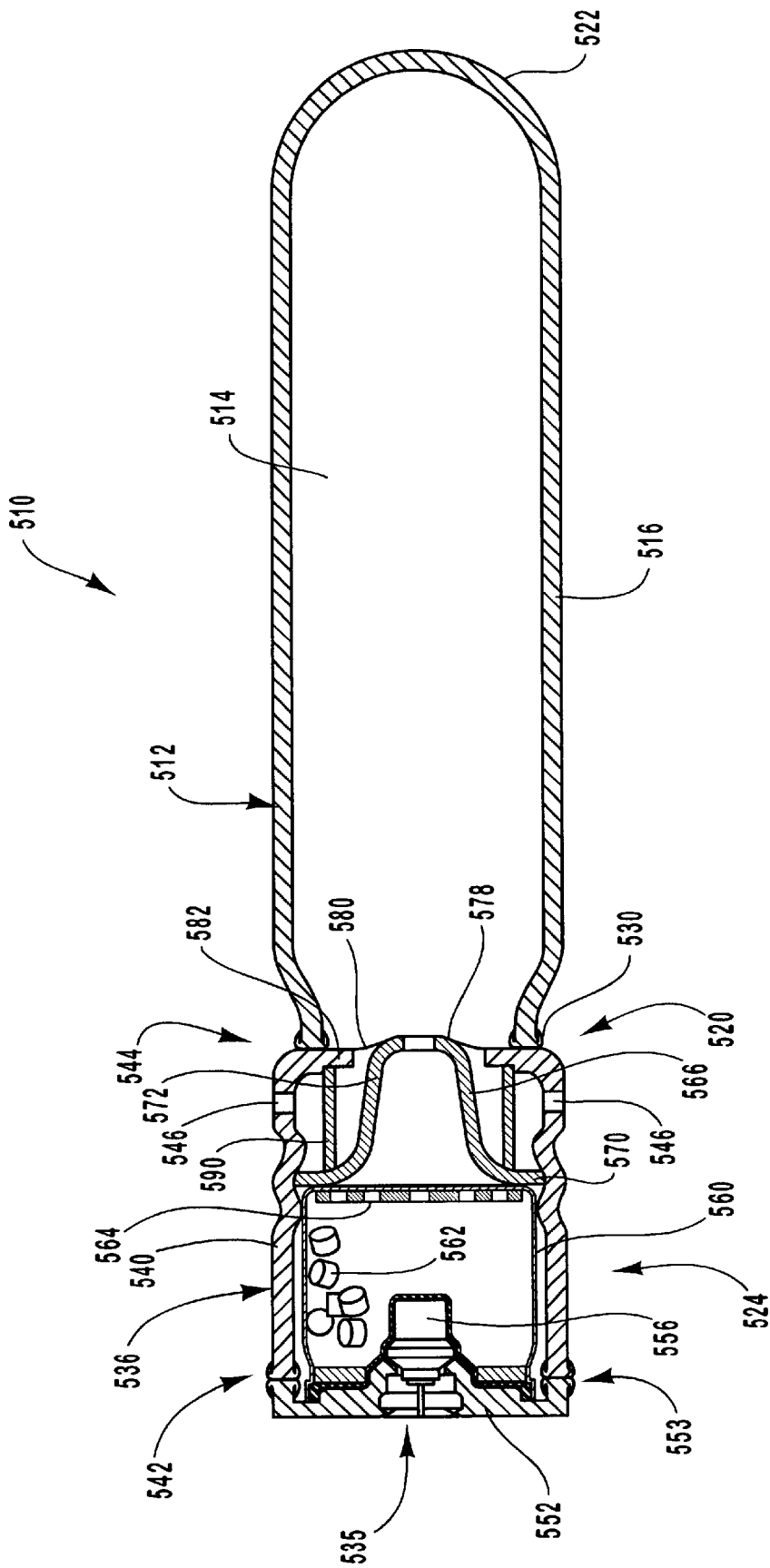

FIG. 8 illustrates an airbag inflator 510 in accordance with an alternative preferred embodiment of the invention. Similar to the above-described embodiments, the inflator 510 includes a first or storage chamber 512 that is filled and pressurized with an expandable fluid 514 effective to provide a gaseous inflation medium.

The airbag inflator 510 differs from the inflators 10, 310 and 410 described above in that the chamber 512, rather than being defined by an elongated cylindrical sleeve having opposite first and second open ends, is defined by a generally cylindrical closed end bottle 516. As shown, such a chamber bottle 516 includes an open first end 520 and a closed second end 522 and may desirably be formed in a one piece construction. As will be appreciated, such a construction desirably may serve to reduce or eliminate the number of welds needed or used in the construction such as by eliminating the need for the welding of an end closure such to close one or more ends of the resulting storage chamber.

Further, while the invention has been described above with respect to the use of a fill port or the like to permit the introduction of materials within the storage chamber of inflator assemblies of the invention, it is to be understood that the broader practice of the invention is not so limited. For example, if desired a fill technique such as disclosed in above-identified commonly assigned U.S. Pat. No. 5,884,938, may be employed. In accordance with such fill method, a cryogenically formed solid mass of a particular desired material is sealed within such a closed end bottle 516 without the use of a fill port. As a result, the corresponding chamber need not include a fill port and a potentially troublesome leak path from the chamber is eliminated.

A diffuser assembly 524, such as generally described above relative to previously described embodiments, is formed or appropriately joined or attached to the bottle first end 520 such as by means of an inertial weld 530. More particularly, the diffuser assembly 524 serve as, contains or holds a chamber opener 535, such as described above to be actuatable to produce a discharge effective to open the first chamber 512 by non-mechanical means. The diffuser assembly 524 includes a housing 536 such as in the general form of a hollow tube side wall 540 having open first and second ends, 542 and 544, respectively and a plurality of exit ports 546, wherethrough the inflation gas from the inflator 510 and, particularly the diffuser assembly 524, is properly dispensed into an associated airbag cushion (not shown).

To the housing first end 542, a diffuser housing end closure 552 is joined by means of an inertial weld 553. As will be appreciated, such form or means of end closure joinder may assist in one or more of the following respects: simplify construction, reduce weight and reduce the costs associated therewith.

The diffuser assembly 524 includes, such as a part of the chamber opener 535, an initiator device 556 and a generant canister 560, such as described above. Within the generant canister 560 there is housed a charge, quantity or supply of a selected reactable gas generant material 562 such as described above and such as may be reacted to form reaction products effective to rupture the generant canister and, upon heat transfer communication with the expandable fluid, result in the expansion of the fluid such as to form an inflation medium for the inflation of an associated airbag cushion.

The diffuser assembly 524 also includes a combustion screen 564 and a flow control element 566 of modified design. In particular, the flow control element 566 though similarly including or forming a base portion 570, a neck portion 572 and a fluid flow conduit 573, such as in the form of a nozzle, as in the above-described embodiments, is of a modified form such as may desirably serve to provide increased support of a rupture or burst disk adjacent thereto. Specifically, the fluid flow conduit 573 has a discharge end 578 that is flared such as to provide support to the adjacent burst disk 580 over a relatively greater or extended area of the burst disk 580. As shown, such increased support may desirably serve to reduce or minimize the proportion of the disk surface area which is not supported by either the conduit discharge end 578 or the associated disk support collar 582.

Similar to the inflator apparatus 10 described above, if desired and as shown, the diffuser assembly 524 may additionally include a screen 590 or like device, interposed between the burst disk 580 and the exit ports 546, and such as may be desired or helpful in removing undesired particulates and the like from the inflation gas prior to passage out of the inflator 510, through the exit ports 546.

Thus, the airbag inflator apparatus 510 includes at least the following specific features or modifications such as may desirably serve to improve performance, reduce cost or both:
1. closed end bottle construction;
2. elimination of fill port;
3. welded diffuser housing end closure; and
4. modified form flow control element.

It will be understood by those skilled in the art and guided by the teachings herein provided that each such feature or modification can desirably be employed or incorporated in various designs either alone or in combination as may be appropriately desired.

Figure 9:
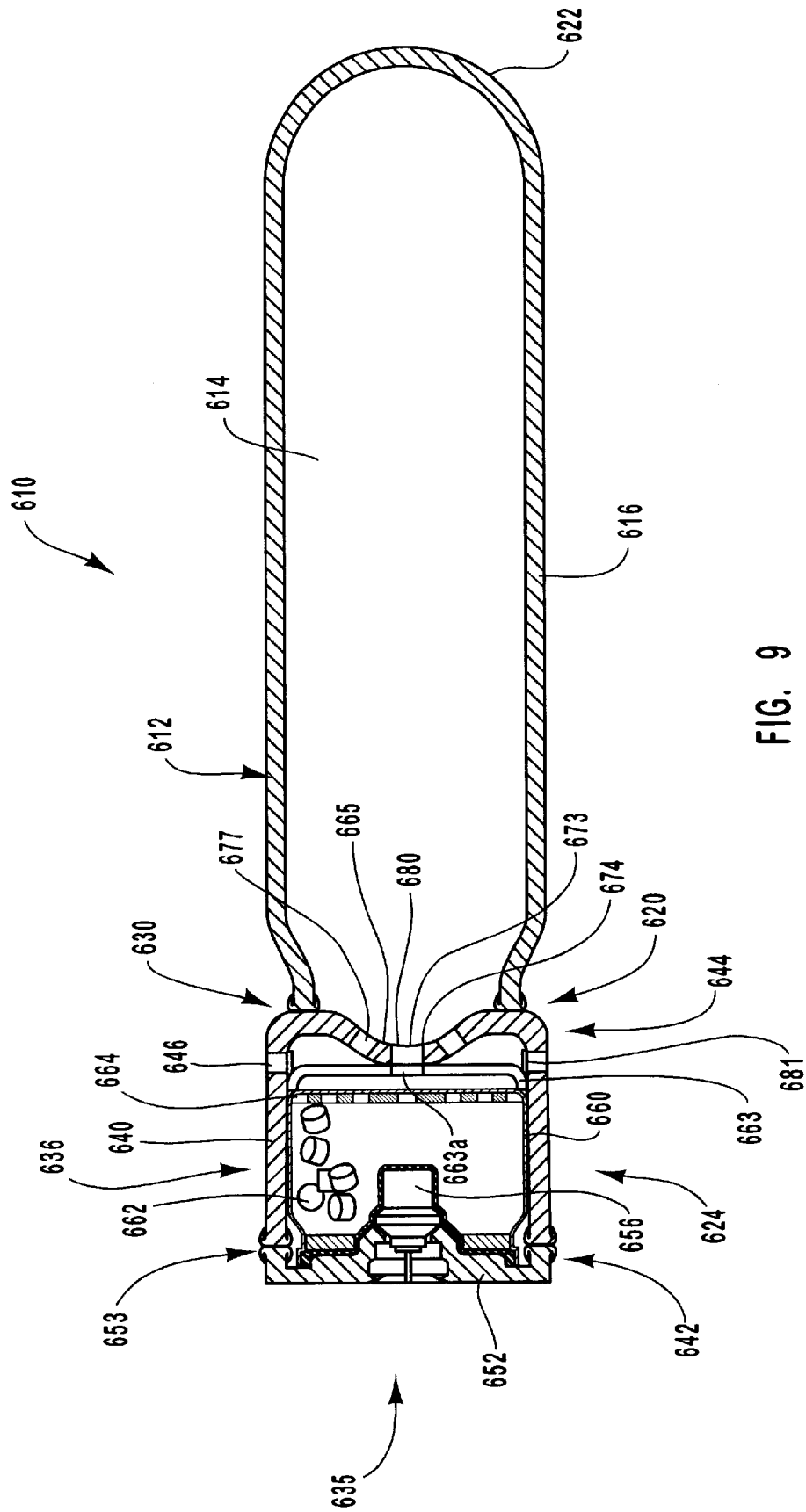

FIG. 9 illustrates an airbag inflator 610 in accordance with yet another alternative preferred embodiment of the invention. The inflator 610 is in some respects similar to the inflator 510 described above. For example, the inflator 610, similar to the inflator 510, includes a first or storage chamber 612 that is filled and pressurized with an expandable fluid 614 effective to provide a gaseous inflation medium and which chamber 612 is defined by a generally cylindrical closed end bottle 616, desirably free of a fill port or the like. The chamber bottle 616 includes an open first end 620 and a closed second end 622

The airbag inflator 610, however, includes a diffuser assembly 624 of modified form, as described in greater detail below. More particularly, the diffuser assembly 624, such as generally described above relative to previously described embodiments, is formed or appropriately joined or attached to the bottle first end 620 such as by means of an inertial weld 630. The diffuser assembly 624, similar to the above-described embodiments, serve as, contains or holds a chamber opener 635, actuatable to produce a discharge effective to open the first chamber 612 by non-mechanical means. The diffuser assembly 624 includes a cup-shaped housing 636 which includes a side wall 640, an open first end 642 and a closed second end 644. The side wall 640 includes a plurality of exit ports 646, wherethrough the inflation gas from the inflator 610 and, particularly the diffuser assembly 624, is properly dispensed into an associated airbag cushion (not shown).

A diffuser housing end closure 652 is joined to the housing first end 642 such as by means of an inertial weld 653 as in the above-described embodiment illustrated in FIG. 8 and such as may simplify construction and reduce the costs associated therewith The diffuser assembly 624 includes, such as a part of the chamber opener 635, an initiator device 656 and a generant canister 660, such as described above. Within the generant canister 660 there is housed a charge, quantity or supply of a selected reactable gas generant material 662 such as described above and such as may be reacted to form reaction products effective to rupture the generant canister and, upon heat transfer communication with the expandable fluid, result in the expansion of the fluid such as to form an inflation medium for the inflation of an associated airbag cushion.

The generant canister 660 also contains, includes or has associated therewith a combustion canister cap 663 such as located at the downstream end of the gas generant canister 660. The inclusion of such a combustion canister cap or the like may be desired in specific embodiments such as to lend structural support to the gas generant canister 660 such to prevent or avoid rupture or opening of the generant canister at a location other than desired. In the illustrated embodiment of FIG. 9, the combustion canister cap 663 is enclosed within the gas generant canister 660 and serves as a support or base for the associated combustion screen 664 also contained within the canister 660.

The combustion canister cap 663 is desirably formed or constructed of lightweight, high strength metal or the like such as commonly employed in inflator constructions. The cap 663 include a central orifice or opening 663a wherethrough the discharge from the gas generant canister 660 can be desirably or otherwise properly directed towards the chamber 612.

The diffuser assembly 624 also includes a flow control element 665 of modified design. In particular, the flow control element 665 is in the general form of an orifice plate formed such as to close the second end 644 of the diffuser housing 636. The flow control element 665 forms, includes or otherwise contains a fluid flow conduit 673, in particular, the fluid flow conduit 673 is formed, at least in part, as an orifice 674. As will be appreciated, while an orifice plate may include such an orifice form fluid flow conduit variously placed or positioned thereon, in practice, such an orifice form fluid flow conduit typically may be desirably centrally placed or positioned on the orifice plate control element 665.

The orifice plate control element 665 also includes storage chamber exit ports 677 wherethrough inflation medium from the storage chamber 612 can be passed into the diffuser assembly 624 for subsequent passage out of the inflator 610 through the ports 646. As will be appreciated, the size, placement and number of storage chamber exit port 677 can be desirably selected to desirably and properly control the flow rate of inflation medium from the inflator apparatus 610.

As shown, the storage chamber exit ports 677 and the flow conduit orifice 673 are desirably sealed by means of a burst disk 680 applied onto the storage chamber side of the orifice plate control element 665.

In the illustrated embodiment, the gas generant canister 660, with its associated underlying combustion canister cap 663, is designed for placement in directed contact with the orifice plate control element 665 such as to create or form a seal between the canister 660 and the flow control element 665 and thereby avoid or prevent combustion products formed by the reaction of the gas generant to exit from the inflator 610 through the exit ports 646 without passing through the orifice 674 and, in turn, into the chamber 612.

Alternatively, or in addition, a rupturable covering such as in form of a metal foil, can be applied over the exit ports 646 to prevent the undesired passage of material therethrough.

In FIG. 9, the combustion canister cap opening 663a and the orifice plate control element orifice 674 are shown as having identical diameters but the broader practice of the invention is not necessarily so limited. For example, in certain applications it may be desirable to make the orifice plate control element orifice of smaller diameter than the combustion canister cap opening so as to increase the pressure required to rupture the associated burst disk. In addition, such differential sizing can serve to prevent the possibility of combustion products formed by the reaction of the gas generant to exit from the inflator through the exit ports without passing through the orifice and, in turn, into the associated storage chamber.

If desired and as shown, the diffuser assembly 624 can include filters 681, such as in the form of metal screen, adjacent to the exit ports 646 to prevent undesired passage of particulate or burst disk fragments from the inflator 610 into an associated airbag cushion.

The use of such a plate form fluid flow control element can desirably reduce the length of the resulting inflator apparatus and thus reduce the envelope required for the installation of such a designed system into a vehicle.

Figure 10:
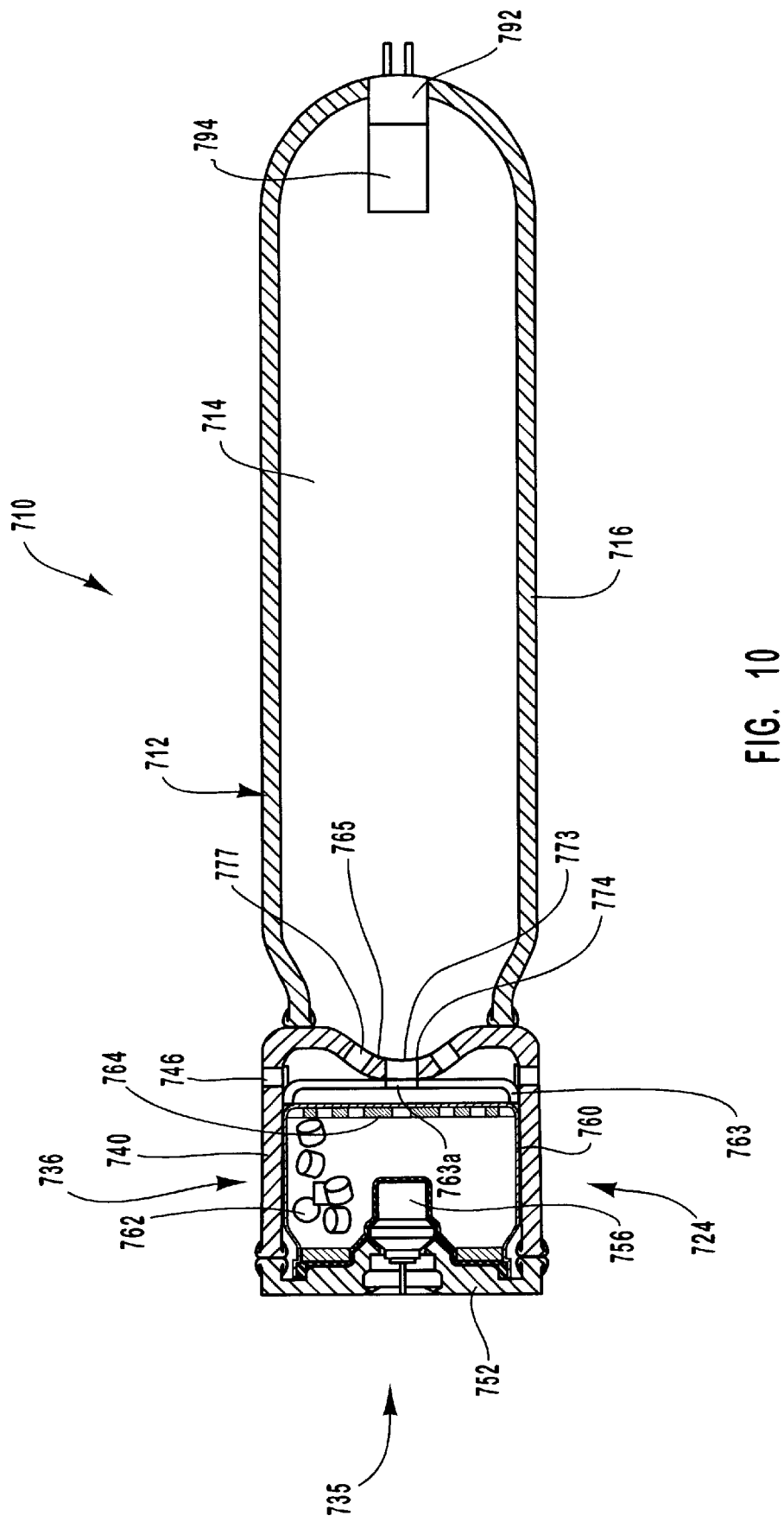

FIG. 10 illustrates an airbag inflator 710 in accordance with yet another alternative preferred embodiment of the invention. The inflator 710 is generally similar to the inflator 610 described above in that it includes a first or storage chamber 712 that is filled and pressurized with an expandable fluid 714 effective to provide a gaseous inflation medium. As in the above-described embodiment, the chamber 712 is defined by a generally cylindrical bottle 716.

The inflator 710, also similar to the inflator 610, includes a diffuser assembly 724 of modified form and serve as, contains or holds a chamber opener 735, actuatable to produce a discharge effective to open the first chamber 712 by non-mechanical means. The diffuser assembly 724 includes a cup-shaped housing 736 which includes a side wall 740 having a plurality of exit ports 746, wherethrough the inflation gas from the inflator 710 and, particularly the diffuser assembly 724, is properly dispensed into an associated airbag cushion (not shown).

The diffuser assembly 724 includes, such as a part of the chamber opener 735, an initiator device 756 and a generant canister 760 in which is housed a charge, quantity or supply of a selected reactable gas generant material 762 such as described above and such as may be reacted to form reaction products effective to rupture the generant canister and, upon heat transfer communication with the expandable fluid, result in the expansion of the fluid such as to form an inflation medium for the inflation of an associated airbag cushion.

The generant canister 760 contains, includes or has associated therewith a gas generant canister cap 763 such as described above and such as may serve as a support or base for the associated combustion screen 764 also contained within the canister 760. The combustion canister cap 763 includes a central orifice or opening 763a wherethrough the discharge from the gas generant canister 760 can be desirably or otherwise properly directed towards the chamber 712

The diffuser assembly 724 also includes a flow control element 765 of modified design, such as described above. In particular, the flow control element 765 is in the general form of an orifice plate and forms, includes or otherwise contains a fluid flow conduit 773 formed, at least in part, as an orifice 774. The orifice plate control element 765 also includes storage chamber exit ports 777, similar to those described above, wherethrough inflation medium can be passed into the diffuser assembly 724 for subsequent passage out of the inflator 710.

The inflator 710 primarily differs from the inflator 610 described above in that the inflator 710 additionally includes or contains a second or, as sometimes referred to herein, an adaptive initiator 792 such as joined to or in discharge communication with at least a portion of the contents of the chamber 712, in particular, in discharge communication with at least a portion of the expandable fluid 714 therein contained.

If desired, a cup or charge holder 794, such as containing a selected quantity of pyrotechnic material, may be included in association with the adaptive initiator 792 and such as may be desired to provide a desirably larger or greater initiator output.

As those skilled in the art and guided by the teachings herein provided will appreciate, the inclusion of such as adaptive initiator may serve to further enhance operational flexibility and adaptability. For example, in such an assembly, the actuation and firing of the adaptive initiator 792 as may be desired, may be either substantially simultaneously or sequentially to the actuation and firing of the primar of main initiator 756. Further, such sequential actuation can be done without any time delay therebetween or with a selected time interval between the actuation and firing of the initiators 756 and 792, respectively.

Additionally, each of the initiators 756 and 792 and associated pyrotechnic charges or the like can be of selected size, energy output or geometry such as to provide particular desired or required performance characteristics.

The incorporation and use presence of liquid phase nitrous oxide is believed to be particularly very advantageous as applied to adaptive output configurations of the subject inflator devices. In particular, making reference to the inflator 710 of FIG. 10 described above, given actuation of the initiator 756 and subsequent combustion of the gas generant material 762 (as described above) fluid begins to flow from the storage bottle 716. Liquefied gas remaining in the storage chamber 712 then begins to vaporize and flow therefrom.

It will be appreciated by those skilled in the art and guided by the teachings herein provided that a relatively high concentration of a dense nitrous oxide-containing fluid in the region near the adaptive initiator 792. As a result, there will generally be a relatively large amount of nitrous oxide available for dissociation and heat release in reactive placement relative to the adaptive initiator 792. Consequently, a relatively small pyrotechnic charge can potentially produce a large change in performance.

With the subject nitrous oxide adaptive output systems, heat is produced by dissociation of at least a fraction of the stored nitrous oxide, as well as by the pyrotechnic charge. In addition, the nitrous oxide undergoing dissociation will produce the added benefit of additional molar output. While in gas phase systems such effect can be rather small, in liquid phase designs this benefit is greatly enhanced, largely because there is a greater relative amount of nitrous oxide present to undergo dissociation. Thus, with the practice of the invention, it is not uncommon to observe performance splits of 50—50, with an additional 10% molar output obtained through dissociation of stored nitrous oxide. The obtainability of such an increased performance split represent a significant improvement over current state of the art stored gas adaptive inflation system devices.

While adaptive inflator designs have been described above making specific reference to the inflator 710 shown in FIG. 10, it will be appreciated by those skilled in the art and guided by the teachings herein provided that such an adaptive output feature can be appropriately incorporated with any of the subject inflator embodiments described above, as may be desired. In particular, such previously described inflator designs may, if desired, appropriately incorporate an adaptive initiator, with or without additional pyrotechnic material.

Thus, the invention provides assemblies and techniques for inflating inflatable restraints such as airbag cushions which are of improved adaptability and which may more easily be adapted to provide particular inflatable restraint inflation dependent on selected operating conditions such as one or more of ambient temperature, occupant presence, seat belt usage and rate of deceleration of the motor vehicle, for example.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 1–3

In these examples, three test inflators identical in structure to the inflator illustrated in FIG. 1 were built. Each of the test inflators included a generally cylindrical fluid flow conduit nozzle (item 73 in FIG. 1) having a diameter of 0.323 inches (8.2 mm) and four circular exit ports (item 46 in FIG. 1) each of which had a diameter of 0.201 inches (5.11 mm). Each of the test inflators was filled with 140 grams of a mixture consisting of 50% nitrous oxide and 50% carbon dioxide. The internal volume of the storage chamber in each of the test inflators was about 11.5 in$^3$ (188.5 cm$^3$), which resulted in a storage pressure of about 860 psia (5.93 MPa) at a temperature of 21° C. Each of the test inflators contained a pyrotechnic generant load of 26.0 grams of roughly cylindrical pellets 0.25 inches×0.80 inches (6.35 mm×20.32 mm). Given dissociation of 30% of the stored nitrous oxide and gas generation from the pyrotechnic source, the total expected molar output from each of the test inflators was 4.3 gmol.

Each of the test inflators was tested at one of three different temperatures of operation, in accordance with TABLE 1.

TABLE 1

| Example | Temperature (° C.) |
| --- | --- |
| 1 | −35 |
| 2 | 21 |
| 3 | 85 |

To ensure that each test inflator had achieved uniformity of temperature, each inflator was conditioned at its particular test temperature for two hours prior to test operation.

Figure 11:
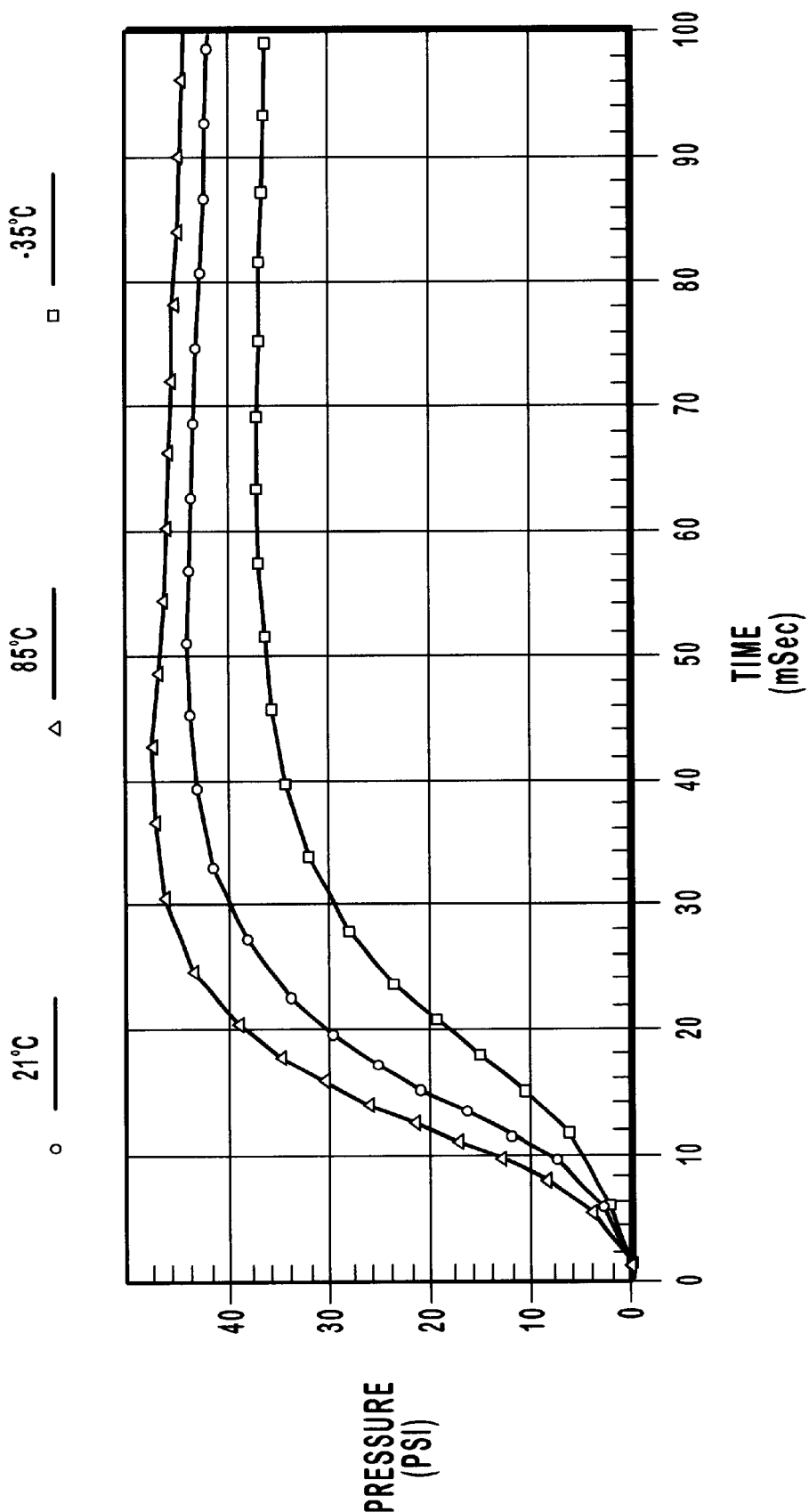
FIG. 11 is a graphical depiction of tank pressure as a function of time performance realized in Examples 1–3.
Figure 12:
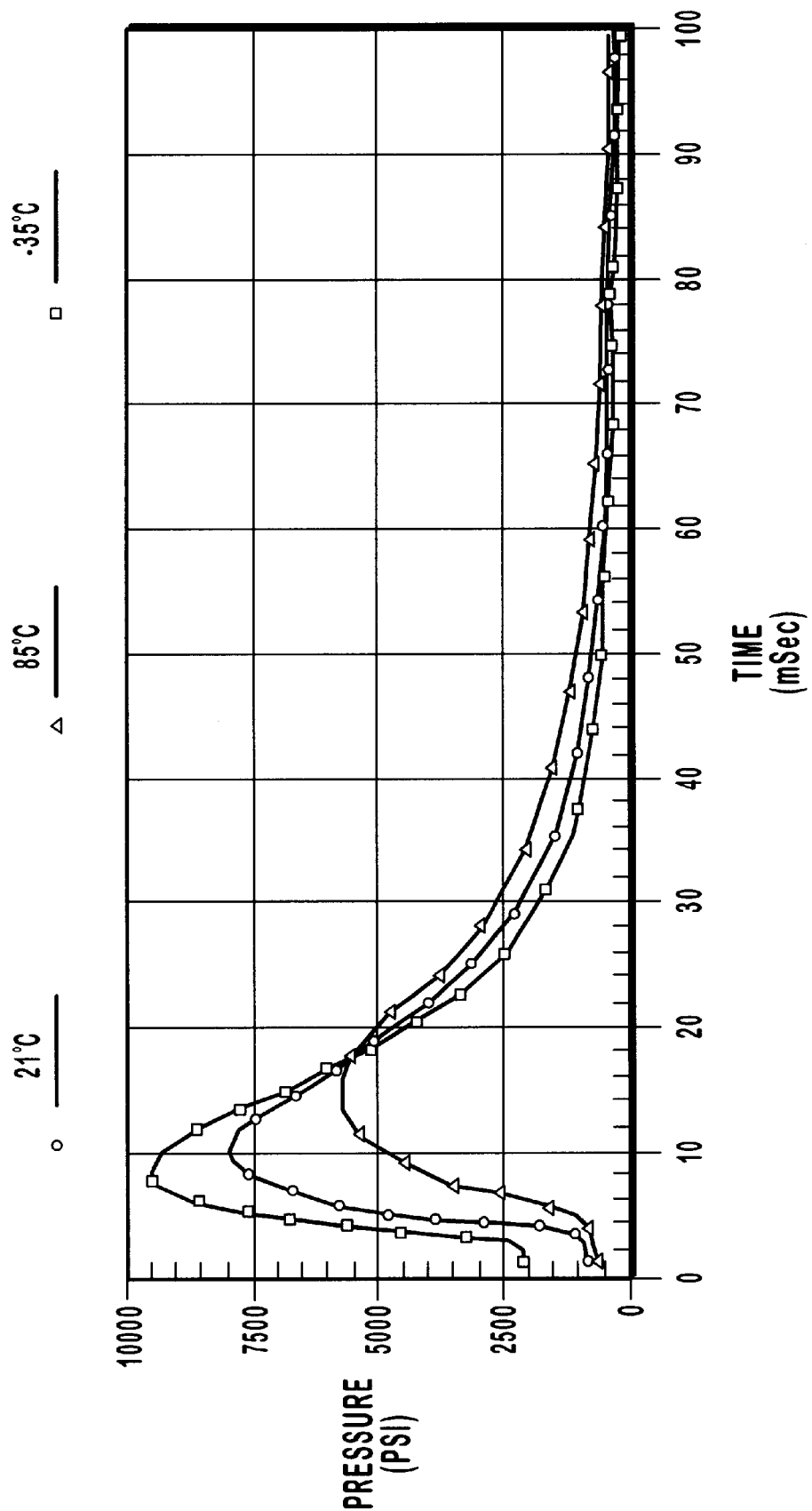
FIG. 12 is a graphical depiction of storage chamber pressure as a function of time performance realized in Examples 1–3.

FIGS. 11 and 12 illustrate the performance realized with the test inflators of EXAMPLES 1–3. More particularly, FIGS. 11 and 12 are graphical depictions of tank pressure and storage chamber pressure, each as a function of time subsequent to inflator actuation, respectively, for the inflators of EXAMPLES 1–3.

DISCUSSION OF RESULTS

As detailed below, the rate of pressure increase (rise rate) as well as the maximum tank and storage chamber pressures were typical of those observed with typical hybrid inflators. Such performance was achieved using inflator devices in accordance with the invention and which inflators: 1) are of significantly reduced envelope, as compared to such typical hybrid inflators; 2) avoid the inclusion or reliance on moving parts while maintaining desired levels of performance (e.g., attain or achieve inflation discharge in accordance with an "S" curve manner) and 3) are of simpler design and construction, such as may reduce the cost associated therewith.

The rate of pressure increase (rise rate) and the maximum tank pressure, shown in FIG. 11 for the test inflators of each of EXAMPLES 1–3, were typical of those inflators required for passenger applications. As the flow through area of the flow control element (i.e., the flow through area of the conduit nozzle) and the size and number of exit ports strongly influence the rise rate, it appears that the test inflators were properly dimensioned in these respects.

The pressures measured within the fluid storage chamber are shown in FIG. 12. It is interesting to note the dependence of the initial pressures (at t=0 ms) on ambient temperature. As mentioned above, given the internal volume and fluid load conditions within the chamber, the initial pressure at a temperature of 21° C. is approximately 860 psia (5.93 MPa). However, at a temperature of 85° C, the internal pressure is about 2000 psia (13.79 MPa), while at −35° C., the initial pressure is only about 650 psia (4.48 MPa). As those skilled in the art and guided by the teachings herein provided, at least in part due to the presence of liquefied gases, the fluid behavior is highly non-ideal.

As shown by the sharp increase in the pressure traces shown in FIG. 12, at a time interval of about three milliseconds following actuation (i.e., t=3 ms), it appears that the structural integrity of the nozzle burst disc ("first sealing portion") was exceeded and hot combustion products began to flow into the fluid storage chamber. The maximum pressures achieved in the storage chamber were typical of those observed in typical hybrid inflators. In particular, such performance was achieved with test inflators having an internal storage chamber volume of 11.5 in$^3$ (188.5 cm$^3$) whereas typical gas filled hybrid inflators would, dependent on the specific nature of the gases used therein, require a gas storage volume of about 21 in$^3$ (344.1 cm$^3$) to provide similar pressure performance.

Thus, it is to be appreciated that the invention provides an inflator apparatus for inflating an inflatable device and a method which utilize a burst disk arrangement which results in a sequential opening regime such as may desirably provide a form of the above-described S curve inflation performance behavior without necessitating the use of or reliance on mechanical opening devices such as projectiles or piston members. As identified above, such operation can advantageously provide what is commonly termed as a "soft deployment" of the associated airbag cushion such as may be desired in various circumstances such as in the event the corresponding vehicle occupant is out-of-position for what is normally considered optimal protection via the restraint system.

Further, an inflator apparatus in accordance with the invention and as described above can advantageously provide a relatively small and low cost compressed gas inflator device such as may be suited for various particular installations and applications.

Still further, the invention provides an adaptive inflator apparatus for inflating an inflatable device and associated methods of operation which more readily permits or otherwise allows a desirably greater range in performance capabilities, such as may more readily provide desired or required design and application flexibility.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, the apparatus comprising:
   a first chamber containing an expandable fluid effective to provide a gaseous inflation medium to inflate the inflatable device;
   a chamber opener actuatable to produce a discharge effective to open the first chamber by non-mechanical means;
   a flow control element including at least one fluid flow conduit having a discharge end wherethrough at least a portion of the discharge from the chamber opener can be transmitted into chamber-opening communication with the first chamber;
   at least one first chamber entrance opening wherethrough the at least a portion of the discharge from the chamber opener can be directed by the at least one fluid flow conduit into the first chamber;
   at least one first chamber exit opening wherethrough at least a portion of the gaseous inflation medium can be discharged from the first chamber;
   a burst disk including a first sealing portion normally preventing flow into the first chamber through the at least one entrance opening and a second sealing portion normally preventing flow out of the first chamber through the at least one exit opening; and
   a diffuser assembly including at least one exit port for directing gaseous inflation medium discharged from the first chamber to the inflatable device.

2. The apparatus of claim 1 wherein:
   the chamber opener comprises a heat source actuatable to produce a quantity of hot product gas; and
   at least a portion of the quantity of hot product gas is transmitted via the at least one fluid flow conduit in heat transmitting communication with the expandable fluid to heat the expandable fluid to form the gaseous inflation medium.

3. The apparatus of claim 2 wherein the heat source comprises a pyrotechnic charge.

4. The apparatus of claim 2 wherein, upon actuation of the apparatus, the chamber opener directs at least a portion of the quantity of hot product gas from the heat source towards the first sealing portion to effect the opening thereof.

5. The apparatus of claim 4 wherein at least a portion of the quantity of hot product gas from the heat source is passed into the first chamber and pressure within the first chamber results in initial opening of the second sealing portion.

6. The apparatus of claim 5 wherein contact of the expandable fluid by the hot product gas results in a pressure increase with the first chamber with the second sealing portion adapted to fully open when a predetermined pressure increase within the first chamber is realized.

7. The apparatus of claim 1 wherein the flow control element comprises an orifice plate and wherein the at least one fluid flow conduit comprises an orifice formed in the orifice plate.

8. The apparatus of claim 1 wherein the flow control element comprises a nozzle forming the at least one fluid flow conduit.

9. The apparatus of claim 8 additionally comprising an orifice ring member effective to prevent movement of the nozzle in the direction of the first chamber upon actuation of the chamber opener, the orifice ring member including a plurality of spaced apart orifices wherethrough the gaseous inflation medium is passed between the first chamber and the inflatable device.

10. The apparatus of claim 9 additionally comprising a pressure-sensitive covering element covering at least one of the plurality of spaced apart orifices whereby flow through the covered orifice is prevented until the pressure against the covering element has attained a predetermined threshold.

11. The apparatus of claim 1 wherein the expandable fluid is at least in part chemically inert.

12. The apparatus of claim 1 wherein the expandable fluid is at least partially in liquid form.

13. The apparatus of claim 1 wherein the expandable fluid comprises a dissociative gas source material.

14. The apparatus of claim 1 wherein the flow control element is non-movable and normally at least in part supports the burst disk against the pressure of the contents of the first chamber.

15. The apparatus of claim 1 wherein the diffuser assembly normally at least in part supports the burst disk against the pressure of the contents of the first chamber.

16. The apparatus of claim 1 wherein the first and second sealing portions of the burst disk are concentrically positioned with the second sealing portion radially disposed relative to the first sealing portion.

17. The apparatus of claim 1 wherein the first sealing portion is sealed to the discharge end of the fluid flow conduit.

18. The apparatus of claim 17 wherein the second sealing portion includes a sealed periphery portion of the burst disk.

19. The apparatus of claim 1 wherein the burst disk includes a scored opening region.

20. The apparatus of claim 1 wherein the discharge end of the at least one fluid flow conduit extends into the first chamber with the burst disk adjacently disposed thereto.

21. The apparatus of claim 1 wherein the burst disk is disposed adjacent the discharge end of the at least one fluid flow conduit and the conduit discharge end is flared to provide support to the burst disk over an extended area thereof.

22. The apparatus of claim 1 additionally comprising an adaptive output initiator in discharge communication with at least a portion of the expandable fluid contents of the first chamber.

23. An apparatus for inflating an inflatable device, the apparatus comprising:
- a first chamber containing an expandable fluid under an elevated pressure and adapted to provide a gaseous inflation medium to inflate the inflatable device;
- a heat source including a second chamber containing a charge of a pyrotechnic material effective, upon ignition, to produce a quantity of hot product gas, the heat source also including an initiator effective, upon actuation, to ignite the pyrotechnic material;
- a nozzle for directing the hot product gas from the heat source to the first chamber, the nozzle having a discharge end wherethrough at least a portion of the quantity of hot product gas from the heat source can be discharged in heat transmitting communication with the contents of the first chamber to heat the expandable fluid to form the gaseous inflation medium;
- at least one entrance opening wherethrough hot product gas can be directed by the nozzle into the first chamber;
- at least one exit opening wherethrough gaseous inflation medium can be discharged from the first chamber;
- a burst disk including a first sealing portion normally preventing flow into the first chamber through the at least one entrance opening and a second sealing portion normally preventing flow out of the first chamber through the at least one exit opening, the first and second sealing portions of the burst disk being concentrically positioned with the second sealing portion radially disposed relative to the first sealing portion, wherein the nozzle at least in part normally supports the first sealing portion against the pressure of the contents of the first chamber with the first sealing portion at least in part sealed to the discharge end of the nozzle; and
- a diffuser assembly including at least one exit port for directing gaseous inflation medium discharged from the first chamber to the inflatable device, wherein the diffuser assembly normally at least in part supports the second sealing portion against the pressure of the contents of the first chamber, the second sealing portion including a sealed periphery portion of the burst disk.

24. The apparatus of claim 23 wherein the expandable fluid comprises a dissociative gas source material.

25. The apparatus of claim 24 wherein the dissociative gas source material comprises nitrous oxide.

26. A method of operation for an airbag inflator, the inflator including:
- a first chamber containing a pressurized expandable fluid effective to provide a gaseous inflation medium;
- a chamber opener actuatable to produce a discharge effective to open the first chamber by non-mechanical means;
- a flow control element including at least one fluid flow conduit having a discharge end wherethrough at least a portion of the discharge from the chamber opener can be transmitted into communication with the first chamber;
- at least one first chamber entrance opening wherethrough the at least a portion of the discharge from the chamber opener can be directed by the at least one fluid flow conduit into the first chamber;
- at least one first chamber exit opening wherethrough at least a portion of the gaseous inflation medium can be discharged from the first chamber;
- a burst disk including a first sealing portion normally preventing flow into the first chamber through the at least one entrance opening and a second sealing portion normally preventing flow out of the first chamber through the at least one exit opening; and
- a diffuser assembly including at least one exit port for directing gaseous inflation medium discharged from the first chamber, said method comprising:
  - actuating the chamber opener to produce a chamber opening discharge;
  - directing at least a portion of the chamber opening discharge through the control element and against the first sealing portion of the burst disk to effect the opening thereof, resulting in expansion of the expandable fluid and formation of the gaseous inflation medium; and
  - subsequently opening the second sealing portion of the burst disk to permit flow of at least a portion of the gaseous inflation medium out of the first chamber through the at least one exit opening and
  - directing at least a portion of the gaseous inflation medium flowing through the at least one exit opening out of the inflator through the at least one exit port.

27. The method of claim 26 wherein the expandable fluid comprises a dissociative gas source material and wherein the formation of the gaseous inflation medium comprises dissociation of at least a portion of the gas source material.

28. The method of claim 27 wherein the dissociative gas source material comprises nitrous oxide.

29. The method of claim 26 wherein the second sealing portion fully opens upon realization of a predetermined pressure increase within the first chamber.

* * * * *